(12) United States Patent
Bent et al.

(10) Patent No.: US 8,566,200 B1
(45) Date of Patent: *Oct. 22, 2013

(54) SYSTEMS AND METHODS FOR MONEY FUND BANKING WITH FLEXIBLE INTEREST ALLOCATION

(75) Inventors: Bruce Bent, Manhasset, NY (US); Bruce Bent, II, Manhasset, NY (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,793

(22) Filed: Aug. 22, 2012

Related U.S. Application Data

(63) Continuation of application No. 13/181,394, filed on Jul. 12, 2011, now Pat. No. 8,260,697, which is a continuation of application No. 12/684,071, filed on Jan. 7, 2010, now Pat. No. 8,019,667, which is a continuation of application No. 12/271,705, filed on Nov. 14, 2008, now Pat. No. 7,668,772, which is a continuation of application No. 10/411,650, filed on Apr. 11, 2003, now Pat. No. 7,509,286, which is a continuation-in-part of application No. 09/677,535, filed on Oct. 2, 2000, now Pat. No. 7,752,129, which is a continuation-in-part of application No. 09/176,340, filed on Oct. 21, 1998, now Pat. No. 6,374,231, said application No. 10/411,650 is a continuation-in-part of application No. 10/071,053, filed on Feb. 8, 2002, now Pat. No. 7,519,551, which is a continuation-in-part of application No. 09/176,340, said application No. 10/411,650 is a continuation-in-part of application No. 10/382,946, filed on Mar. 6, 2003, now Pat. No. 7,536,350, which is a continuation-in-part of application No. 09/176,340.

(60) Provisional application No. 60/372,347, filed on Apr. 12, 2002.

(51) Int. Cl.
*G06Q 40/00* (2012.01)
*G06Q 40/02* (2012.01)
*G06Q 40/06* (2012.01)
*G06Q 20/10* (2012.01)

(52) U.S. Cl.
USPC ............... 705/35; 705/36 R; 705/39; 705/38; 705/37

(58) Field of Classification Search
USPC ................................. 705/35, 36 R, 39, 38, 37
See application file for complete search history.

(56) References Cited

U.S. PATENT DOCUMENTS 4,232,367 A * 11/1980 Youden et al. ................... 705/38
4,346,442 A * 8/1982 Musmanno ................. 705/36 R
(Continued)

FOREIGN PATENT DOCUMENTS

JP 10-049590 A 2/1998
WO WO-95/23379 A1 8/1995
(Continued)

OTHER PUBLICATIONS

Ref. U—New rules for FDIC Deposit Insurance, Christopher Hencke, ABA Bank Compliance: Jul./Aug. 1999; 20,7: ABI/INFORM Global, pp. 31-37.*

(Continued)

*Primary Examiner* — Barbara Joan Amelunxen
(74) *Attorney, Agent, or Firm* — Foley & Lardner LLP

(57) ABSTRACT

Method, system and program product, the method comprising: accessing databases comprising: aggregated account information FDIC-insured and interest-bearing aggregated deposit accounts held in banks in a program, wherein funds from a first plurality client accounts are associated with broker dealers, and client account information, obtaining fund transfer data for broker-dealer client accounts; allocating amounts to banks in the program; determining funds to be transferred to or from the banks based on the allocating step; updating databases; determining a respective interest rate from among at least three different interest rates based at least in part on criteria so that funds of some client accounts held in a respective one of the aggregated deposit accounts earns interest at a different interest rate from the funds of other client accounts held in the respective one aggregated deposit account; calculating for client accounts respective interest amounts.

28 Claims, 9 Drawing Sheets

(56) References Cited

U.S. PATENT DOCUMENTS

| | | | |
|---|---|---|---|
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |
| 4,985,833 A * | 1/1991 | Oncken ............................ 705/42 | |
| 5,126,936 A | 6/1992 | Champion et al. | |
| 5,206,803 A | 4/1993 | Vitagliano et al. | |
| 5,220,501 A | 6/1993 | Lawlor et al. | |
| 5,235,507 A | 8/1993 | Sackler et al. | |
| 5,262,942 A | 11/1993 | Earle | |
| 5,270,922 A | 12/1993 | Higgins | |
| 5,291,398 A * | 3/1994 | Hagan ............................... 705/4 | |
| 5,297,032 A | 3/1994 | Trojan et al. | |
| 5,424,938 A | 6/1995 | Wagner et al. | |
| 5,631,828 A | 5/1997 | Hagan | |
| 5,644,727 A | 7/1997 | Atkins | |
| 5,649,116 A * | 7/1997 | McCoy et al. ................... 705/38 | |
| 5,671,363 A | 9/1997 | Cristofich et al. | |
| 5,689,650 A | 11/1997 | McClelland et al. | |
| 5,710,889 A | 1/1998 | Clark et al. | |
| 5,765,144 A | 6/1998 | Larche et al. | |
| 5,774,880 A | 6/1998 | Ginsberg | |
| 5,781,654 A | 7/1998 | Carney | |
| 5,802,499 A | 9/1998 | Sampson et al. | |
| 5,806,048 A | 9/1998 | Kiron et al. | |
| 5,806,049 A | 9/1998 | Petruzzi | |
| 5,812,987 A | 9/1998 | Luskin et al. | |
| 5,826,243 A | 10/1998 | Musmanno et al. | |
| 5,848,400 A * | 12/1998 | Chang ............................. 705/35 | |
| 5,852,811 A | 12/1998 | Atkins | |
| 5,864,685 A | 1/1999 | Hagan | |
| 5,875,437 A | 2/1999 | Atkins | |
| 5,878,258 A | 3/1999 | Pizi et al. | |
| 5,878,405 A | 3/1999 | Grant et al. | |
| 5,884,285 A | 3/1999 | Atkins | |
| 5,890,141 A | 3/1999 | Carney et al. | |
| 5,893,078 A | 4/1999 | Paulson | |
| 5,903,881 A | 5/1999 | Schrader et al. | |
| 5,905,974 A | 5/1999 | Fraser et al. | |
| 5,940,809 A | 8/1999 | Musmanno et al. | |
| 5,941,996 A | 8/1999 | Smith et al. | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein et al. | |
| 6,014,642 A | 1/2000 | El-Kadi et al. | |
| 6,016,482 A | 1/2000 | Molinari et al. | |
| 6,026,438 A | 2/2000 | Piazza et al. | |
| 6,032,133 A | 2/2000 | Hilt et al. | |
| 6,041,314 A | 3/2000 | Davis | |
| 6,044,371 A | 3/2000 | Person et al. | |
| 6,047,324 A | 4/2000 | Ford et al. | |
| 6,049,782 A * | 4/2000 | Gottesman et al. ......... 705/36 R | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna et al. | |
| 6,112,191 A | 8/2000 | Burke | |
| 6,119,093 A | 9/2000 | Walker et al. | |
| 6,131,810 A | 10/2000 | Weiss et al. | |
| 6,154,770 A | 11/2000 | Kostakos | |
| 6,189,785 B1 | 2/2001 | Lowery | |
| 6,192,347 B1 | 2/2001 | Graff | |
| 6,226,623 B1 | 5/2001 | Schein et al. | |
| 6,317,783 B1 | 11/2001 | Freishtat et al. | |
| 6,324,523 B1 * | 11/2001 | Killeen, Jr. et al. ......... 705/36 R | |
| 6,363,360 B1 | 3/2002 | Madden | |
| 6,374,231 B1 | 4/2002 | Bent et al. | |
| 6,408,336 B1 * | 6/2002 | Schneider et al. ............ 709/229 | |
| 6,513,020 B1 | 1/2003 | Weiss et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,124,101 B1 | 10/2006 | Mikurak | |
| 7,133,840 B1 | 11/2006 | Kenna et al. | |
| 7,203,845 B2 | 4/2007 | Sokolic et al. | |
| 7,206,761 B2 | 4/2007 | Colvin | |
| 7,216,100 B2 | 5/2007 | Elliott | |
| 7,321,874 B2 | 1/2008 | Dilip et al. | |
| 7,321,875 B2 | 1/2008 | Dilip et al. | |
| 7,328,179 B2 | 2/2008 | Sheehan et al. | |
| 7,376,606 B2 | 5/2008 | Jacobsen | |
| 7,383,223 B1 | 6/2008 | Dilip et al. | |
| 7,383,227 B2 | 6/2008 | Weinflash et al. | |
| 7,392,222 B1 | 6/2008 | Hamilton et al. | |
| 7,401,037 B2 * | 7/2008 | Arena et al. .................... 705/35 | |
| 7,440,914 B2 | 10/2008 | Jacobsen | |
| 7,505,937 B2 | 3/2009 | Dilip et al. | |
| 7,509,286 B1 | 3/2009 | Bent et al. | |
| 7,519,551 B2 | 4/2009 | Bent et al. | |
| 7,529,709 B2 | 5/2009 | Volchek et al. | |
| 7,536,340 B2 | 5/2009 | Dheer et al. | |
| 7,536,350 B1 | 5/2009 | Bent et al. | |
| 7,596,522 B1 | 9/2009 | Jacobsen | |
| 7,603,307 B2 | 10/2009 | Jacobsen | |
| 7,640,199 B1 | 12/2009 | Hyland | |
| 7,657,761 B2 | 2/2010 | Sokolic et al. | |
| 7,668,771 B1 | 2/2010 | Bent et al. | |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |
| 7,680,734 B1 | 3/2010 | Bent et al. | |
| 7,716,131 B2 | 5/2010 | Bent et al. | |
| 7,720,755 B1 | 5/2010 | Coyle | |
| 7,729,987 B1 | 6/2010 | Wakim et al. | |
| 7,752,107 B1 | 7/2010 | Bent et al. | |
| 7,752,129 B2 | 7/2010 | Bent et al. | |
| 7,756,767 B2 | 7/2010 | Cluse et al. | |
| 7,769,688 B1 | 8/2010 | Bent et al. | |
| 7,788,235 B1 | 8/2010 | Yeo | |
| 7,797,207 B1 | 9/2010 | Dilip et al. | |
| 7,809,640 B1 | 10/2010 | Bent et al. | |
| 7,814,017 B2 | 10/2010 | Vancini et al. | |
| 7,837,100 B2 | 11/2010 | Bonalle et al. | |
| 7,860,771 B2 | 12/2010 | Colvin | |
| 7,873,571 B1 * | 1/2011 | Wehmer .......................... 705/39 | |
| 7,873,573 B1 | 1/2011 | Realini | |
| 7,873,677 B2 | 1/2011 | Messing et al. | |
| 7,886,969 B2 | 2/2011 | Antoo et al. | |
| 7,895,098 B2 | 2/2011 | Beard | |
| 7,895,099 B2 | 2/2011 | Whiting et al. | |
| 7,899,743 B2 | 3/2011 | Jacobsen | |
| 7,899,745 B1 | 3/2011 | Jacobsen | |
| 7,899,746 B1 | 3/2011 | Jacobsen | |
| 7,899,747 B1 | 3/2011 | Jacobsen | |
| 7,904,372 B2 | 3/2011 | Whiting et al. | |
| 7,917,433 B2 | 3/2011 | Jacobsen | |
| 7,921,057 B1 | 4/2011 | Jacobsen | |
| 7,933,821 B1 | 4/2011 | Bent et al. | |
| 7,945,511 B2 | 5/2011 | O'Brien et al. | |
| 7,996,308 B1 | 8/2011 | Bent et al. | |
| 8,015,085 B2 | 9/2011 | Blagg et al. | |
| 8,019,667 B1 | 9/2011 | Bent et al. | |
| 8,019,668 B1 | 9/2011 | Bent et al. | |
| 8,032,456 B1 | 10/2011 | Bent et al. | |
| 8,036,986 B2 | 10/2011 | Jacobsen | |
| 8,051,004 B2 | 11/2011 | Jacobsen | |
| 8,051,005 B2 | 11/2011 | Jacobsen | |
| 8,086,508 B2 | 12/2011 | Dheer et al. | |
| 8,090,651 B2 | 1/2012 | Winslow et al. | |
| 8,103,582 B1 | 1/2012 | Zettner | |
| 8,191,156 B2 | 5/2012 | Kubo | |
| 8,239,321 B1 | 8/2012 | Bent et al. | |
| 8,260,697 B1 | 9/2012 | Bent et al. | |
| 8,260,705 B1 | 9/2012 | Bent et al. | |
| 8,290,859 B1 | 10/2012 | Bent et al. | |
| 8,290,860 B1 | 10/2012 | Bent et al. | |

(56) References Cited

U.S. PATENT DOCUMENTS

| | | |
|---|---|---|
| 8,290,861 B1 | 10/2012 | Bent et al. |
| 8,311,916 B1 | 11/2012 | Bent et al. |
| 8,311,939 B1 | 11/2012 | Bent et al. |
| 8,352,342 B1 | 1/2013 | Bent et al. |
| 8,355,985 B1 | 1/2013 | Bent et al. |
| 8,370,236 B1 | 2/2013 | Bent |
| 8,380,621 B1 | 2/2013 | Bent et al. |
| 8,401,962 B1 | 3/2013 | Bent |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent et al. |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1* | 1/2003 | Jacobsen ............. 705/35 |
| 2003/0041003 A1 | 2/2003 | Kayser, III |
| 2003/0080185 A1 | 5/2003 | Werther |
| 2003/0135437 A1* | 7/2003 | Jacobsen ............. 705/35 |
| 2003/0149646 A1 | 8/2003 | Chen et al. |
| 2003/0163403 A1* | 8/2003 | Chen et al. ............. 705/36 |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del Rey et al. |
| 2004/0177036 A1 | 9/2004 | Nutahara et al. |
| 2004/0249741 A1* | 12/2004 | Understein ............. 705/37 |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1* | 5/2006 | Del Rey et al. ............. 705/35 |
| 2006/0155644 A1 | 7/2006 | Reid et al. |
| 2006/0167773 A1 | 7/2006 | Yang et al. |
| 2006/0212389 A2 | 9/2006 | Bent et al. |
| 2006/0213980 A1 | 9/2006 | Geller et al. |
| 2006/0273152 A1 | 12/2006 | Fields |
| 2007/0043666 A1 | 2/2007 | Burdette |
| 2007/0083938 A1 | 4/2007 | Aoki et al. |
| 2007/0118449 A1 | 5/2007 | De La Motte |
| 2007/0130065 A1 | 6/2007 | Staab et al. |
| 2007/0143196 A1* | 6/2007 | Colvin ............. 705/35 |
| 2007/0255655 A1* | 11/2007 | Kemper et al. ............. 705/39 |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0138412 A1 | 5/2009 | Jacobsen |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1 | 5/2011 | Jay et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |

FOREIGN PATENT DOCUMENTS

| | | |
|---|---|---|
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/025,402, filed Feb. 4, 2008, Bent.
U.S. Appl. No. 12/385,522, filed Apr. 10, 2009, Bruce Bent et al.
U.S. Appl. No. 12/408,507, filed Mar. 20, 2009, Bruce Bent.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent II et al.
U.S. Appl. No. 12/829,961, filed Jul. 2, 2010, Bruce Bent, et al.
U.S. Appl. No. 12/408,507, filed Mar. 20, 2009, Bruce Bent et al.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

(56) References Cited

OTHER PUBLICATIONS

AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackvvell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Benker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.

CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007(6 Sheets).
Deposit Growth Strategies for Financial Institutions, New Sweep Account Helps Retain $40 Million in Business Deposits, vol. 7, No. 12, The Reserve Funds, May 2001, 1 Sheets.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dirst. Ct., District of Delaware, Civil Action No. 82-630, May 30, 1984, 6 Sheets.
Dreyfus Insured Deposit Program, Disclosure Statement and Terms and Conditions, Deryfus A BNY Mellon Company, received Jan. 2008 approx, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by *Island Intellectual Property LLC, Lids Capital LLC, Double Rock Corporation,* and *Intrasweep LLC* against *Deutshe Bank Trust Company Americas* and *Total Bank Solutions, LLC,* Defendant Deutsche Bank Trust Company America's responses to Intrasweep's common interrogatory Nos. 1-5, Confidential—Attorneys only, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation,* and *Intrasweep LLC* against *Deutshe Bank Trust Company Americas* and *Total Bank Solutions, LLC,* Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation,* and *Intrasweep LLC* against *Deutshe Bank Trust Company Americas* and *Total Bank Solutions, LLC,* Defendant Total Bank Solutions, LLC's responses to Double Rock's Common interrogatory Nos. 1-10 to defendants, Reservation of Right, Civil Action No. 09 Civ. 2675 (VM) (AJP).
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from

(56) References Cited

OTHER PUBLICATIONS

FDIC Federal Register Citations: Email From American Banker, by Bert Ely, Feb. 24, 2006, Viewpoint: FDIC's Account Link Plan a Pointless, Costly Threat.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, received Oct. 2004, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_. . . .
Garmhausen, "Matching Small Banks with Large Muni Deposits," American Banker, Online The Financial Services Resource, Oct. 4, 2005, 4 pages, http://www.finstar.com/docs/AmericanBanker.html.
Garton, Thomas W.; Are LLC Banks in the Cards? Stay Tuned; Frederikson & Byron, P.A.; Jun. 2003; http://www.fredlaw.com/articles/banking/bank_0306_twig.html; 2 pages.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In The Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, received Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.
Lavine, "Check Out High-Yield Checking Accounts," Broward Daily Business Review, vol. 39, No. 102, 2 Sheets, Apr. 27, 1998.
Lawsuit by *Island Intellectual Property LLC, Lids Capital. LLC, Double Rock Corporation* and *Intrasweep LLC*, against *Promontory Interfinancial Network, LLC, Deutsche Bank AG, Deutsche Bank Trust Company Americas* and *Total Bank Solutions, LLC*, Complaint, Apr. 14, 2009, Case No. 09 CV 3750.
Lawsuit by *Carlo DeBlasio et al.* against *Merrill Lynch & Co., Inc. et al.*, Declaration of Andrew W. Stern, including Exhibits A, B, C, D, E and F, Nov. 12, 2007, Case No. 07-cv-318 (RJS) (Document 59).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merill Lynch Banks", . . . .
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by *Carlo DeBlasio et al.* against *Merrill Lynch & Co., Inc. et al.*, Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).
Lawsuit by *Carlo DeBlasio et al.* against *Merrill Lynch & Co., Inc. et al.*, Declaration of Matthew J. Terry in Support of Motion to Dismiss by Defendants Wachovia Corporation, Wachovia Securities, LLC, Wachovia Bank, N.A., and Wachovia Bank of Delaware, N.A., including Exhibit A, B, C and D, Nov. 14, 2007, Case No. 07-318 (RJS) (Document 67).
Lawsuit by *Carlo DeBlasio et al.* against *Merrill Lynch & Co., Inc. et al.*, Declaration of Scott D. Musoff in Support of the Merrill Lynch Defendants' Motion to Dismiss The Second Amended Class Action Complaint, ECF Case, Nov. 12, 2007, Case No. 07-cv-318 (RJS) (Document 64).
Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).
Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.
Lawsuit by *Carlo DeBlasio et al.* against *Merrill Lynch & Co., Inc. et al.*, Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008 Case No. 07-cv-318 (RJS) (Document 79).
Lawsuit by *Carlo DeBlasio, et al.* against *Merrill Lynch & Co., Inc., et al.*, Opinion and Order Regarding Motions, Jul. 27, 2009, Case No. 07 CIV 318(RJS).
Lawsuit by *Island Intellectual Property LLC* against *Clearview Correspondent Services, LLC, et al.*; Complaint for Patent Infringement; Civil Action No. 1:11-cv-448 (LO/TRJ); Apr. 26, 2011; 55 pages.
Lawsuit by *Island Intellectual Property LLC* against *First Southwest Company*; Complaint for Patent Infringement; Civil Action No. 1:11-cv-00371-UNA; Apr. 26, 2011; 42 pages.
Lawsuit by *Island Intellectual Property LLC* and *Intrasweep LLC* against *Deutsche Bank Trust Company Americas* and *Total Bank Solutions, LLC*, Deutsche Bank answer to plaintiffs' Feb. 23, 2010 complaint and counterclaims, May 4, 2010, Civil Action No. 09 Civ. 2675 (VM) (AJP)(Document 111).
Lawsuit by *Island Intellectual Property LLC* and *Intrasweep LLC* against *Deutsche Bank Trust Company Americas* and *Total Bank Solutions, LLC*, Total Bank Solutions, LLC's answer to plaintiffs' Feb. 23, 2010 complaint and counterclaims, May 4, 2010, Civil Action No. 09 Civ. 2675 (VM) (AJP) (Document 112).
Lawsuit by *Island Intellectual Property LLC* and *Intrasweep LLC* against *Institutional Deposits Corp.* The Island Plaintiffs' Complaint against Defendant Institutional Deposits Corp., Nov. 4, 2009, Civil Action No. 1 09-CV-3079.

(56) References Cited

OTHER PUBLICATIONS

Lawsuit by *Island Intellectual Property LLC* and *Intrasweep LLC* against *Institutional Deposits Corp.*, Complaint for Patent Infringement, Jury Trial Demanded, Nov. 4, 2009, Civil Action No. 09 CV 3079.

Lawsuit by *Island Intellectual Property LLC* and *Intrasweep LLC* against *Institutional Deposits Corp.*, Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by *Island Intellectual Property LLC* and *Lids Capital LLC* against *Deutsche Bank Trust Company Americas* and *Total Bank Solutions, LLC*, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by *Island Intellectual Property LLC* and *Lids Capital LLC* against *Deutsche Bank Trust Company Americas* and *Total Bank Solutions, LLC*, Total Bank Solutions, LLC's answer to plaintiff's Mar. 16, 2010 complaint and counterclaims, May 4, 2010, Civil Action No. 09 Civ. 2675 (VM)(Document 114).

Lawsuit by *Island Intellectual Property LLC et al.*, against *Deutsche Bank Trust Company Americas, et al.*; Expert Report of Richard T. Powers Concerning Invalidity of U.S. Pat. Nos. 7,519,551; 7,536,350; 7,668,771; 7,668,772, 7,672,886; and 7,680,734; and Exhibits A-R; Civil Action No. 09 Civ.2675(VM)(AJP), Oct. 28, 2010; 1,119 pages.

Lawsuit by *Island Intellectual Property LLC v. Clearview Correspondent Services, LLC et al.*; Branch Banking & Trust Company's Answer to Complaint and Counterclaims; Civil Action No. 1:11-cv-448-LO-IDD; Jun. 20, 2011; 13 pages.

Lawsuit by *Island Intellectual Property LLC v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.

Lawsuit by *Island Intellectual Property LLC v. Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.

Lawsuit by *Island Intellectual Property LLC v. First Southwest Company*; First Southwest Company's Answer to Complaint and Counterclaims; Civil Action 1:11-cv-371-SD; Jun. 20, 2011; 11 pages.

Lawsuit by *Island Intellectual Property LLC, et al.* against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by *Island Intellectual Property LLC, et al*, against *Deutsche Bank Trust Company Americas, et al.*; Expert Report of the Honorable Gerald J. Mossinghoff and Exhibits A-E; Civil Action No. 09 Civ. 2675 (VM)(AJP); Nov. 23, 2010; 107 pages.

Lawsuit by *Island Intellectual Property LLC, et al.*, against *Deutsche Bank Trust Company Americas, et al.*; Defendant Deutsche Bank Trust Company Americas' Fifth Spplemental Responses to Island IP's First Set of Common Interrogatories to All Defendants (No. 7); Case No. 09 Civ. 2675 (VM) (AJP); Sep. 16, 2010; 9 pages.

Lawsuit by *Island Intellectual Property LLC, et al.*, against *Deutsche Bank Trsut Company Americas, et al.*; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by *Island Intellectual Property LLC, Intrasweep LLC* and *Double Rock Corporation* against *Deutsche Bank AG, Deutsche Bank Trust Company Americas and Total Bank Solutions, LLC*, Complaint for Patent Infringement, May 19, 2009, Case No. 09 CIV 4673.

Lawsuit by *Island Intellectual Property LLC, Lids Capital LLC*, and *Double Rock Corporation* against *Deutsche Bank AG, Deutsche Bank Trust Company Americas* and *Total Bank Solutions, LLC*, including Cover Sheet, Summons, Complaint and Rule 7.1 Statement, Mar. 24, 2009, Case No. 09 CV 2677.

Lawsuit by *Island Intellectual Property LLC, Lids Capital LLC*, and *Double Rock Corporation* against *Promontory Interfinancial Network, LLC* and *MBSC Securities Corporation*, including Cover Sheet, Summons, Complaint and Rule 7.1 Statement, Mar. 24, 2009, Case No. 09 CV 2675.

Lawsuit by *Island Intellectual Property LLC, Lids Capital LLC, Double Rock Corporation* and *Intrasweep LLC* against *Deutsche Bank AG, Deutsche Bank Trust Bank Trust Company Americas* and *Total Bank Solutions, LLC*, Stipulated Dismissal of Deutsche Bank AG Without Prejudice, Nov. 19, 2009, Civil Action No. 09 CIV 2675 (VM) (AJP) (Document 79).

Lawsuit by *Island Intellectual Property LLC, Lids Capital LLC, Double Rock Corporation* and *Intrasweep LLC* against *Deutsche Bank Trust Company Americas* and *Total Bank Solutions, LLC*, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by *Island Intellectual Property LLC, Lids Capital LLC, Double Rock Corporation* and *Intrasweep LLC* against *Deutsche Bank Trust Company Americas* and *Total Bank Solutions, LLC*, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total bank Solutions, LLC*, Answer and Counter Claims, Answer of Defendant MBSC Securities Corporation, Jun. 25, 2009, Case No. 09 CV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Answer and Counter Claims, Answer of Defendant Promontory Interfinancial Network, LLC, Jun. 25, 2009, Case No. 09 CV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Consolidated First Amended Complaint, Jury Trial Demanded, Jun. 11, 2009, Civil Action No. 09 CIV 2675 (VM).

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Deutsche Bank AG's Answer to Consolidated First Amended Complaint, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Deutsche Bank Trsut Company Americas' Answer to Consolidated First Amended Complaint and counter Claims, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Jury Trial Demanded, Total Bank Solutions, LLC's Answer to Consolidated First Amended Complaint and Counterclaims, Jun. 25, 2009, Civil Action No. 09 CIV 2675.

Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and

(56) References Cited

OTHER PUBLICATIONS

*Total Bank Solutions, LLC*,Stipulated Dismissal of Counts I-II of Defendant Promontory Interfinancial Network, LLC's, Counterclaims with Prejudice, Oct. 19, 2009, (Document 68).
Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, Stipulation and Order, Oct. 29, 2009, Case No. 09 CV 2675 (VM) (AJP) (Document 73).
Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendant Deutsche Bank Trust Company Americas' Counterclaims, Jul. 9, 2009, Civil Action No. 09 CIV 2675 (VM).
Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendant MBSC Securities Corporation's Counterclaims, Jul. 9, 2009, Civil Action No. 09 CIV 2675 (VM).
Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions, LLC*, The Island Plaintiffs' Reply to Defendant Promontory Interfinancial Network LLC's Counterclaims, Jul. 9, 2009, Civil Action No. 09 CIV 2675 (VM).
Lawsuit by *Island Intellectual Property LLC, Lids Capital LLC, Double Rock Corporation* and *Intrasweep LLC* against *Promontory Interfinancial Network LLC, MBSC Securities Corporation, Deutsche Bank AG, Deutsche Bank Trust Company Americas* and *Total Bank Solutions LLC*, The Island Plaintiffs' Reply to Defendant Total Bank Solutions, LLC's Counterclaims, Jul. 9, 2009, Civil Action No. 09 CIV 2675 (VM).
Lawsuit by *Promontory Interfinancial Network, LLC* against *Double Rock Corporation p/k/a Reserve Management Corporation* and *Lids Capital LLC*, Amended Complaint, Mar. 27, 2009, Civil Action No. 1:09 CV 316.
Lawsuit by *Promontory Interfinancial Network, LLC* against *Double Rock Corporation p/k/a Reserve Management Corporation*, Complaint, Mar. 24, 2009, Civil Action No. 1:09 CV 316.
Lawsuit by *Promontory Interfinancial Network, LLC* against *Double Rock Corporation p/k/a Reserve Management Corporation, Island Intellectual Property LLC, Lids Capital LLC* and *Intersweep LLC*, Amended Complaint, Apr. 15, 2009, Civil Action No. 3:09 CV 217.
Lawsuit by *Promontory Interfinancial Network, LLC* against *Double Rock Corporation, p/k/a Reserve Management Corporation, Island Intellectual Property LLC* and *Lids Capital LLC and Intrasweep LLC*, Complaint, May 19, 2009, Civil Action No. 3:09 CV 322.
Lawsuit by *Promontory Interfinancial Network, LLC* against *Double Rock Corporation, p/k/a Reserve Management Corporation, Island Intellectual Property LLC* and *Lids Capital LLC*, including Cover Sheet, Summons and Complaint, Apr. 14, 2009, Civil Action No 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No-Act., Lexis 1593, Securities Exchange of Act of 1934—Section 15(a), Jan. 8, 1985, 11 Sheets.

Letter from Michael Bradfield, General Counsel, Board of Governors of the Federal Reserve System, Nov. 16, 1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of CASH: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000, 4 Sheets.
Merrill Lynch Announces Beyond Banking, The Power of Advice for Smarter Cash Management, Jan. 8, 2 Sheets.
Merrill Lynch, Pierce, Fenner & Smith Incorporated, "Information Statement," 2000, 12 Sheets.
Merrill Moves CMA Cash to Bank, Street Talk, on Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, Nov. 12, 2002, 4 Sheets.
Northbrook Bank & Trust Company, Seven Times the Security of a Normal CD, Introducing our MaxSafe CD, Nov. 25, 2002, 4 Sheets.
O'Brian, "Money-Market Funds Suit Many Investors, But Proud Creator Frets About Extra Risk", Re-Printed From The Wall Street Journal, Monday, Nov. 6, 2000, Dow Jones & Company, Inc., 2 Sheets.
Office Action on 078883-0161 DTD Aug. 26, 2003.
On Wall Street, Helping Brokers Build a More Successful Business, The Power of CASH, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.

(56) References Cited

OTHER PUBLICATIONS

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Annouces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), feb. 5, 2003, 5 pages.
Reserve Insured Deposits, United States Patent and Trademark Office, Reg. No. 2,694,910, Registered Mar. 11, 2003, 1 Sheet.
Reserve Management Corporation, Reserve Insured Deposits, U.S. Appl. No. 73/315,600.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Instustutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwriting, 6 Sheets.
The Insured Savings Account, Issuer Guide to Offering MMDAs Through Merrill Lynch, Merrill Lynch Money Markets, Inc., "Operational Guide to the Merrill Lynch MMDA Porgram 1986", Sep. 1986 3 Sheets.
The Pershing Press, Dreyfus Insured Deposit Program, Issue 2, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From The Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http:www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions,com, Jan. 26, 2005, 2 pgs.
USA Mutual Partners Insured Cash Shelter Account Terms and Comnditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Lawsuit by *Carlo DeBlasio et al*. against *Merrill Lynch & Co., Inc. et al*., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", . . . Feb. 5, 2008 (Document 71).

(56) References Cited

OTHER PUBLICATIONS

*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al,* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al.* v. *Deutsche Bank Trust Company Americas, et al.;* Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.;* Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche Bank Trust Company Americas, et al.;* Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.;* Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.* v. *Deutsche Bank Trust Company Americas, et al.;* Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al.* v. *Deutsche Bank Trust Company Americas, et al.;* Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al.* v. *Deutsche Bank Trust Company Americas, et al.;* Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al.* v. *Deutsche Bank Trust Company Americas, et al.;* Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al.* v. *Deutsche Bank Trust Company Americas, et al.;* Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Lawsuit by *Island Intellectual Property LLC et al.* v. *Deutsche Bank Trust Company Americas, et al.;* Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC, et al.* v. *Deutsche Bank company Americas et al.*; Declaration of Olivia M. Kim in Support of Defendants' Motion for Summary Judgement of Invalidity Under 35 U.S.C. § 101; Oct. 6, 2011; Case 1:09-cv-02675-VM, Document 197.
Lawsuit by *Island Intellectual Property LLC, et al.* v. *Deutsche Bank Trust Company Americas, et al.* Plaintiffs' Memorandum of Law in Opposition to Defendants' Motion for Summary Judgement of Invalidity Under 35 U.S.C. § 101; Nov. 2, 2011; Case 1:09-cv-02675-VM, Document 201.
Lawsuit by *Island Intellectual Property LLC, et al.* v. *Deutsche Bank Trust Company Americas, et al.;* Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC, et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al.* v. *Deutsche Bank Trust Company Americasa, et al.;* Order; Dec. 7, 2011; Case 1:09-cv-02675-VM, Document 212.
Lawsuit by *Island Intellectual Property LLC, et al.* v. *Deutsche Bank Trust Company Americas, et al.;* Special Master's Report and Recommended Decision on Defendants' Summary Judgement Motion of Invalidity Under 35 U.S.C. § 101; Dec. 19, 2011.
Lawsuit by *Island Intellectual Property LLC, et al.* v. *Deutsche Bank Trust Company Americas, et al.;* Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.;* Nov. 28, 2011; Case 1 :09-cv-02675-VM; Document 211.
Martens, Don W.; letter to Hon. Victor Marrero re. tentative rulings on claim construction in *Island Intellectual Property LLC et al.* v. *Deutsche Bank Trust Co., et al.;* Nov. 28, 2011; Case 1:09-cv-02675-VM, Document 210.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
Hencke, Christopher; New Rules for FDIC Deposit Insurance; ABA Bank Compliance, Jul./Aug. 1999, 20,7; pp. 31-37.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC, et al.* v. *Deutsch Bank Trust Company Americas, et al.;* Defendant Deutsche Bank Trust Company Americas' Second Supplemental Responses to Double Rock's Interrogatories Nos. 2 8 and 9, Jul. 2010 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," 9/99; 6 pages.
Investors MoneyAccountSM and Insurance Plus Service Agreement, attached Schedule A (List of Banks Participating in the Insurance Plus Service), IMAD Mar. 1994, 3 pages.
Investors Money AccountSM (an FDIC-insured money market account), IMA-1 (Mar. 1994), 4 pages.
Investors MoneyAccountsSM, "The FDIC-Insured Money Market Ivestment with an Important Plus," IMA Oct. 1995, 2 pages.

(56) References Cited

OTHER PUBLICATIONS

1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), p. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU,PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002, for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit ProgramSM, (attached Q&A: Important Information about the New Salomon Smith Barney Bank Deposit Program), Aug. 16, 2002, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regualtions, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved from the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirement of deposity Institutions (Regulation D)12 CFR Ch. II (Jan. 1, 2010 Edition), p. 94-128, Pt. 204-Pt. 205.
Letter to G.T. Schwartz, from O.I. Ireland, dated Jun. 22, 1988, re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Summary Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.

(56) References Cited

OTHER PUBLICATIONS

Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986, 36 pages.
Merrill Lynch, The Merrill Lynch Capital BuilderSM Account Financial Service, Insured SavingsSM Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995: Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Annoucement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City—Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccountSM and Insurance Plus Service Agreement, Schedule A, 3 sheets.
Investors MoneyAccountSM (an FDIC-insured money market account), 4 sheets.
Investors MoneyAccountSM the FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, Jul. 17, 2009 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 FRC Monitor, Dec. 2003, 2 sheets.
Crane, P. & Krasner, Mike, An iMoney Net Special ReportTM, "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.
Interest Rate Review© A Publication of Meyer Weekly Interest Rate Survey, A Look at Tiers, vol. II, No. 4, Apr. 1987, 6 pgs.
Interest Rate Review© A Publication of Meyer Weekly Interest Rate Survey, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", On Wall Street, Nov. 2000, 1 sheet.
Quest Insured Acoount, QUESTessentials, 3 sheets.
Quest Insured Account, Information Statement, 5 sheets.
OCC Insured Bank Deposit Account, 3 sheets.
Insured Bank Deposit Account, Information Statement, Jul. 1, 2000, 2 sheets.
Letter from Marilyn J. Hensle, announcing Salomon Smith Barney Bank Deposit Program. SM, with Q&A, 14 sheets.

(56) References Cited

OTHER PUBLICATIONS

Bank Deposit program Disclosure Statement, Salomon Smith Barney, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by *Island Intellectual Property LLC* and *Intrasweep LLC* against *Deutsche Bank Trust Company Americas* and *Total Bank Solutions*, Complaint for Patent Infringement, Jury Trial Demanded, Feb. 23, 2010, Case No. CV 1518, (Document 1).
Lawsuit by *Island Intelelctual Property LLC* and *Lids Capital LLC* against *Deutsche Bank Trust Company Americas* and *Total Bank Solutions*, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. Lyra Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.

(56) References Cited

OTHER PUBLICATIONS

Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals INC, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured AccountSM, PrimeVest, http://primevest.com/flexInsured_account.asp, Jan. 14, 2010, 1 sheet.
FlexInsuredSM Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali.pcg.pages.products-services.aspx, Nov. 4, 2009, 2 sheets.
Terms and conditions for cash sweep, sterne agee, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Franicsco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.orq/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid.1/, nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up tp $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.

(56) References Cited

OTHER PUBLICATIONS

Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.12.5.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage Free Webiners, http://209.235.145/cgi-bin/websuite/tcsassnwebsuite.pl? . . . , Nov. 2, 2009, 2 sheets.
Kentucky Bankers Association, Alternative for excess deposit coverage Free Webiners, http://209.235.145/cgi-bin/websuite/tcsassnwebsuite.pl?. . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, 3 pgs.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
U.S. Appl. No. 12/453,387, filed May 8, 2009, Bruce Bent.
U.S. Appl. No. 12/453,388, filed May 8, 2009, Bruce Bent.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 12/816,092, filed Jun. 15, 2010, Bruce Bent.
U.S. Appl. No. 13/032,456, filed Feb. 22, 2011, David Edgar Gareis.
U.S. Appl. No. 13/032,467, filed Feb. 22, 2011, Thomas O'Donnell.
U.S. Appl. No. 13/228,031, field Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,818, filed Aug. 22, 2012, Bruce Bent.
U.S. Appl. No. 13/650,927, filed Oct. 12, 2012, David Edgar Gareis.
U.S. Appl. No. 13/651,932, filed Oct. 15, 2012, Bruce Bent.
U.S. Appl. No. 13/710,999, filed Dec. 11, 2012, Bruce Bent II.
U.S. Appl. No. 13/715,370, filed Dec. 14, 2012, Bruce Bent.

Lawsuit by *Island Intellectual Property LLC, Lids Capital LLC, Double Rock Corporation,* and *Intrasweep LLC* against *Deutsche Bank Trust Company Americas,* and *Total Bank Solutions, LLC,* Defendants' Preliminary Invalidity Contentions, Mar. 12, 2010, Civil Action No. 09 Civ. 2675 (VM) (AJP).
Lawsuit by *Island Intellectual Property LLC* and *Intrasweep LLC* against *Institutional Deposits Corp.,* Defendant Institutional Deposits Corp.'s Preliminary Invalidity Contentions, Case No. 09-Cv-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Account' System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent. No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
American Express—Meeting Notes, Sep. 26, 2000, 2 pages.
American Express Conference Call Minutes, Topic: Tiered Balances, Jan. 25, 2001 @ 3:00pm-4:00pm, 2 pages.
American Express Financial Advisors Customized FDIC Product with Tiered Balances, Jan. 24, 2001, 2 pages.
Email to abufalino@vedderprice.com, from S. Johnson, Re: ReserveFunds and Wayne Hummer, dated Jul. 14, 2003 (attached email to S. Johnson, from abufalino@vedderprice.com on Jun. 26, 2003, Re: ReserveFunds and Wayne Hummer), 2 pages.
Fax to T. Vezeau, from L. Boone, Re: BBII's request to fax to you, dated Dec. 26, 2002 (attached Memo to K.A. Jacklin, from A. Rova, Re: Lert discovery, dated Dec. 23, 2002), 3 pages.
Letter to A.J. Bufalino, from C.R. Macedo, Re: Reserve Management Corporation, Wayne Hummer Investments LLC, Our File: 71297/80, dated Jan. 3, 2006, 2 pages.
Letter to A.J. Bufalino, from C.R. Macedo, Re: Reserve Management Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007, 2 pages.
Letter to A.J. Bufalino, from C.R. Macedo, Re: Reserve Management Corporation, Wayne Hummer Investments LLC, Our File: 71297/80, dated May 8, 2007 (attached Appendices 1-3) 6 pages.
Letter to A.J. Bufalino, from S. Johnson, Re: Response to May 29, 2003 letter/email correspondence, dated Aug. 5, 2003, 1 page.

(56) References Cited

OTHER PUBLICATIONS

Letter to A.J. Bufalino, from S. Johnson, Re: Response to May 29, 2003 letter/email correspondence, dated Aug. 5, 2003 (enclosing Jul. 16, 2003 letter to T.M. McDonald, May 29, 2003 fax to B. Bent II, Jan. 10, 2003 letter to R.L. Kratzer, note page), 7 pages.
Letter to A.J. Bufalino, from S. Johnson, Re: U.S.P.N. 6,374,231, dated May 29, 2003, 2 pages.
Letter to A.J. Bufalino, from T.J. Vezeau, Re: U.S.P.N. 6,374,231, dated Feb. 11, 2003, 1 page.
Letter to C.R. Macedo, from A.J. Bufalino, Re: Reserve Management Corporation, Wayne Hummer Investments LLC, Our File: 71297/80, dated Mar. 16, 2006, 1 page.
Letter to J. Van De Graff, from R.L. Kratzer, Re: Reserve Management Corp. Assertion, dated Feb. 13, 2003, 1 page.
Letter to R.L. Kratzer, from T.J. Vezeau, Re: U.S.P.N. 6,374,231, dated Jan. 10, 2003, 1 page.
Letter to T.J. Vezeau, from A.J. Bufalino, Re: U.S.P.N. 6,374,231, dated Feb. 7, 2003, 1 page.
Letter to T.M. McDonald, from B. Bent II, Re: FDIC insured money market products, dated Jul. 16, 2003, 1 page.
Letter to T.M. McDonald, from B. Bent II, Re: FDIC insured money market products, dated Jul. 16, 2003 (enclosing Jul. 14, 2003 email to abufalino@vedderprice.com. May 29, 2003 letter to A.J. Bufalino, Feb. 13, 2003 letter to J. Van De Graaff, Feb. 11, 2003 letter to A.J. Bufalino, Feb. 7, 2003 letter to T.J. Vezeau, Jan. 10, 2003 letter to R.L. Kratzer), 9 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Pat, Bruce Bent, from Bruce Bent II, re: Reserve Insured Deposit Account, Sep. 4, 1997, 1 page.
Memo to Marianne, Ralph, Customer Service, from Bruce Bent II, Re: Reserve IDA, Sep. 4, 1997, 1 page.
Case for "CORE" Deposits, Historic Degree of Stability, 2006, 1 page.
Announcing Changes in Automatic "Sweep" Investment Options, LPL Financial Services, Linsco/Private Ledger, Member NASD/SIPC, Jun. 26, 2006, 26 Sheets.
Lawsuit by Carlo DeBlasio et al. against Merrill Lynch & Co., Inc. et al., Declaration of Joel P. Laitman in Support of Plaintiff's Memorandum of Law in Opposition to Defendants' Motion For Dismissal of the Second Amended Class Action Complaint, Including: "Client Commitment"; "Get Started Today"; "Total Merrill"; "Guideline For Business Conduct"; "Commitment to Clarity"; "Cash Management Account"; "Information Statement Regarding Changes To Interest Rates On Deposits in Merrill Lynch Banks", Feb. 5, 2008.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994; 2 Sheets.
Reserve Management Corporation, Reserve Insured Deposits, U.S. Appl. No. 76/315,600, Issued; Sep. 21, 2001.
The Unmatched Sweep Solution From The Cash Management Expert, 1999; 2 Sheets.
Waddell, "Sweeping Clean," Advisor, The Advisor to Advisors, Oct. 2001; 2 Sheets.
Scottrade Bank Deposit Program—Terms, Conditions & Disclosures; Author unknown; Aug. 2011; pp. 1-3.
Information Statement, "Alliance Insured Account," Sep. 1999; 6 pages.
Investors MoneyAccountSM and Insurance Plus Service Agrrement, attached Schedule A (List of Banks Participating in the Insurance Plus Service), IMAD Mar. 1994; 3 pages.
Investors Money AccountSM (an FDIC-insured money market account), IMA-1, Mar. 1994; 4 pages.
Investors MoneyAccountSM, "The FDIC-Insured Money Market Investment with an Important Plus," IMA, Oct. 1995; 2 pages.
Salomon Smith Barney, "Bank Deposit Program Disclosure Statement," 2002; 3 pages.
Merrill Lynch, "Insured Savings™ Account Fact sheet," The Merrill Lynch Cash Management Account® Financial Service, 1987; 11 pages.
Insured Bank Deposits™ Program Summary Information Statement, May 9, 2002; 11 pages.
Wayne Hummer Investments, "Insured Bank Deposits™ Program, Frequently Asked Questions," 2001 or earlier; 4 pages.
First City, Texas Insured Savings Agency Agreement with Exhibits A-B and Insured Savings Program, 1996 or earlier; 10 pgs.
Insured Savings Remote Site Sweep Prodecures, 1996 or earlier; 3 pgs.
Insured Savings Rate Change Notice, Jul. 17, 1990; 1 pg.
Addendum to Insured Savings Agency Agreement, Jul. 17, 1990; 1 pg.
Insured Savings Balance Limits form, 1996 or earlier, 1 sheet.
Cash Management Balance Monitoring Agreement Form; 1996 or earlier; 1 sheet.
Investors MoneyAccountSM and Insurance Plus Service Agreement, Schedule A, Mar. 1994; 3 sheets.
Investors MoneyAccountSM (an FDIC-insured money market account), Apr. 1996; 4 sheets.
Investors MoneyAccountSM The FDIC-Insured Money Market with an Important Plus., Apr. 1996; 2 sheets.
Insured Money Account Program Agreement and Disclosure Statement, Mar. 2000; 11 sheets.
Quest Insured Account, QUESTessentials, May 17, 1994; 3 sheets.
OCC Insured Bank Deposit Account, Jun. 1993; 3 sheets.
Letter from Marilyn J. Hensle, annoucing Saloman Smith Barney Bank Deposit Program. SM, with Q&A, Aug. 16, 2000; 14 sheets.
The Merrill Lynch Cash Management Account, Financial Service, 1982; 18 pgs.
The Insured Savings Account, Issuer Guide to Offering MMDAs through Merrill Lynch, Jul. 1986; 27 pgs.
H.C. Denision Company, Sheboygan, WI, retrieved from Internet Nov. 2, 2009; 1 sheet.
Investment Account Application, Cleared Through Legent Clearing, May 2006; 2 sheets.
Customer Agreement, Cleared Through Legent Clearing, May 2006; 3 pgs.
Frequent Asked Questions: FDIC Sweep Program, optionsXpress; retrieved from Internet Jan. 6, 2010; www.optionsxpress.com/welcome/faq/aq/fdc.aspx#rate.
Terms & Conditions for optionsXpress' Bank Insured Deposit Program, optionsXpress, Oct. 14, 2009; 6 pgs.
Money Market Mutual Fund and FDIC-Insured Deposit Program Rates & Bank List, Jan. 5, 2010; www.pershing.com/rates.html, 1 sheet.
The financial organizer, ProCash Plus, Apr. 2007; 12 pgs.
FAQs about the Deutsche Bank insured deposit program, Securities America, Jul. 17, 2009; 3 pgs.
Over $12,5 million of FDIC deposit insurance available, Insured Deposit Program, Deutsche Bank, www.insureddepositsonline.com, Apr. 2009; 1 sheet.
Insured deposit online, Deutsche Bank Insured Deposit Program, list of program banks, retrieved from Internet May 14, 2009; 2 sheets.
Insured deposit online, The Insured Deposit Program, Evolve Bank & Trust, retrieved from Internet Apr. 3, 2009; 2 sheets.
Who can benefit from the insured deposit program?, Insured Deposit Program, Pulaski Bank, Apr. 2009; 2 sheets.
Deutsche Bank, Deutsche Bank insured deposit program, Dec. 18, 2009; 3 pgs.
Deutsche Bank Insured Deposits, Bank list as of Dec. 18, 2009, 1 sheet.
Lawsuit by Island Intellectual Property LLC and Intrasweep LLC against Institutional Deposits Corp., Defendant Institutional Deposits Corp.'s Preliminary Invalidity Contentions, Mar. 15, 2010; Case No. 09-CV-03079-JEC.
Exhibit 10, Invalidity Chart: Merrill Lynch Banking Advantage Program ("MLBA Program") , U.S. Patent No. 7,509,286, recieved in Mar. 2010; 22 pgs.

* cited by examiner

SYSTEMS AND METHODS FOR MONEY FUND BANKING WITH FLEXIBLE INTEREST ALLOCATION

CROSS-REFERENCE TO RELATED PATENT APPLICATIONS

This application is a Continuation of U.S. application Ser. No. 13/181,394 filed Jul. 12, 2011, which is a Continuation of U.S. application Ser. No. 12/684,071 filed Jan. 7, 2010 which is a continuation of U.S. application Ser. No. 12/271,705, filed Nov. 14, 2008, which is a Continuation of U.S. application Ser. No. 10/411,650, filed Apr. 11, 2003, now U.S. Pat. No. 7,509,286, which claims priority from Provisional Application U.S. Application 60/372,347, filed Apr. 12, 2002 and which is also a Continuation-In-Part of U.S. application Ser. No. 09/677,535 filed Oct. 2, 2000, Ser. No. 10/071,053 filed Feb. 8, 2002, now U.S. Pat. No. 7,519,551, and Ser. No. 10/382,946 filed Mar. 6, 2003, now U.S. Pat. No. 7,536,350. U.S. application Ser. No. 09/677,535 filed Oct. 2, 2000, Ser. No. 10/071,053 filed Feb. 8, 2002, and Ser. No. 10/382,946 filed Mar. 6, 2003 are continuations-in-part of U.S. application Ser. No. 09/176,340 filed Oct. 21, 1998, now U.S. Pat. No. 6,374,231. All these applications are incorporated herein by reference in their entirety.

BACKGROUND OF THE INVENTION

1. Field of the Invention

The invention relates generally to computerized account management techniques and, more specifically, to techniques by which financial entities may offer accounts allowing unlimited withdrawals while the deposited funds earn interest at rates that can be flexibly assigned and are covered by deposit insurance.

2. Background Art

It would be desirable if depositors and investors could obtain FDIC insured, interest-bearing accounts with interest rates that can be flexibly assigned, with an unlimited number of fund transfers per month, and with insurance that may exceed $100,000. However, account offerings in the United States ("US") are limited by statutes generally codified as Title 12 of the United States Code ("U.S.C.") (Banks and Banking). These statutes and accompanying regulatory scheme limit investors and depositors seeking investments and deposits having a lower risk profile to a rather limited selection of choices, all of which suffer inhibiting constraints.

Financial entities are prevented from paying interest on certain types of deposit accounts, especially "demand deposit accounts" that permit unlimited withdrawals of deposited funds, by relevant statutes and regulations, namely Title 12 U.S.C. Chapter 3 (Federal Reserve System); Title 12 Code of Federal Regulations ("C.F.R.") Chapter II Part 204 (12 C.F.R. §§204.1-204.136) (Federal Reserve Board ("FRB") Regulation D); and Title 12 C.F.R. Chapter II Part 217 (12 C.F.R. §§217.1-217.101) (FRB Regulation Q).

More specifically, 12 CFR 329.2 states that "no bank shall, directly or indirectly, by any device whatsoever, pay interest on any demand deposit." A "deposit" is any money placed into a checking account, savings account, Certificate of Deposit (CD), or the like. In a "demand" account, the owner can make an unlimited number of funds transfers to another account (having the same or a different owner), or to a third party, typically by bank drafts, checks, credit cards, and debit cards. In essence, an account in which a depositor has the ability to make at least six transfers will be deemed a demand account and no interest will be payable on the funds therein (unless the funds are held in a NOW account under 18 U.S.C. 1832(a)). Therefore, owners of demand accounts are denied interest on their funds.

Second, deposit insurance provided by the Federal Deposit Insurance Corporation ("FDIC") is limited in various ways. The FDIC is a federal governmental entity created under Title 12 U.S.C. Chapter 3 (the Federal Deposit Insurance Corporation) that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF").

The rules governing insurance of deposits in institutions insured by the BIF and the SAIF are the same. In particular, according to 12 U.S.C. §1821(a), the FDIC limits insurance coverage provided to the owners(s) of funds deposited in each insured institution to $100,000, and bases insurance coverage on the concept of ownership rights and capacities, that is funds held in different ownership categories are insured separately from each other; and funds owned by the same entity but held in different accounts at the same financial entity are subsumed under the same insurance coverage.

Additionally, such insured, interest-bearing, demand accounts with flexibly-assigned interest rates would be desirable not only for depositors and investors but also for financial entities such as broker/dealers, savings institutions, credit unions, and the like seeking their deposits. In more detail, broker/dealers and some other financial institutions have been able to pay interest on their deposits. However, these deposits are not backed by insurance comparable to that provided by the FDIC (a portion of cash in broker/dealer accounts may be insured by SPIC). Also, their interest-rate flexibility is strictly limited by the securities statutes. For example, under the Regulated Investment Company Act of 1940, money market mutual funds, which are often used to provide income on deposits, must pay the same rate of return to each account owner, thereby limiting an institution's ability to respond to the varying profitability of different classes of accounts.

Banks and other savings institutions have developed several approaches, which include money fund sweeps and repurchase agreement ("repo") sweeps, in an effort to compete with those financial institutions, principally broker/dealers, who are able to offer interest on cash balances for their commercial customers. However, these approaches are disadvantageous in that they involve a removal of commercial customer deposits from the bank's balance sheets. This disadvantage is especially burdensome for smaller, regional or local banks.

Further, banking institutions have been able to take advantage of the interest-rate flexibility permitted by statute and regulation to address a problem of bank management that has grown in importance, namely the differential profitability of different classes of accounts. The economics of bank management are such that costs for an account are relatively fixed, and are largely independent of account balances. However, income from a given account is generally a function of the differential in the interest paid and that earned by the bank in subsequent re-investments of account funds. In particular, accounts with significant account balances are substantially more profitable, in comparison with accounts that have lower balances.

For example, prior art certificates of deposit or CDs are issued by banks to provide an insured interest bearing investment that preserves the invested capital. Typically, CDs are a commitment by the depositor for a select period of time, e.g., 6 months, or 2 years, etc. where the deposits remain without any access by the investor for alternate uses. To create incentives for investing larger amounts of capital, many banks use their interest-rate flexibility to vary the interest rate paid on CDs in two dimensions. Along a first dimension, CDs pay a rate that will vary depending how long the funds are committed. Longer commitment periods are rewarded with a corresponding higher rate of return. Along a second dimension, many banks permit investors to gain a greater interest rate when the investor commits an increasing amount to the CD. These variations are very attractive to investors, but are linked to the severe handicap suffered by all CDs, in that any alternate use of the funds or penalty-free early withdrawal is essentially foreclosed.

Therefore, what is needed are systems and methods for providing insured, interest-bearing accounts at broker/dealers, savings institutions, credit unions, and the like with interest rates that can be flexibly assigned with an unlimited number of fund transfers per month, and with insurance that may exceed $100,000. It would be especially advantageous if these systems could be readily integrated into the existing infrastructure of a broker/dealer, savings institution, or credit union and in a manner that would minimally disrupt existing relationships between clients and their broker/dealers, savings institutions, credit unions and other financial entities.

Citation or identification of any reference in this Section or any section of this application shall not be construed that such reference is available as prior art to the present invention.

SUMMARY OF THE INVENTION

Objects of the Invention

Therefore, in view of the prior art, the objects of this invention include the following. One object is to provide new systems and methods that, in cooperation with the existing systems and methods of a broker/dealer, savings institution, credit union, or other financial entities generally ("a Customer financial entity" or a "Customer"), manage a plurality of accounts for multiple depositors or investors of the Customer institution ("Clients of the Customer financial entity" or "Clients") so that the funds in the accounts return flexibly-allocated interest income, are properly insured, and are available for unlimited (at least more than six) transfers per month.

It is another object that the provided systems and methods permit the interest-income allocation to be based on fixed or variable rate structures, to provide for Customer financial entity account marketing promotions.

It is another object that the provided systems and methods allow Clients of Customer financial entities to deposit funds by means of any of various known methods, and to make payments from the account by means of any of various known methods and instruments.

It is another object that the provided systems and methods permit the interest-income allocation to be based on plural discrete tiers or on a function for setting the interest rate levels seen by clients in accordance with account parameters such as current cash balance, nature of the Client-Customer-financial entity relationship, and so forth.

It is another object that the provided systems and methods have minimal impact on presently-existing, Customer-financial-entity-to-Client relationships, and are readily merged into the existing systems and methods of the Customer financial entity.

It is another object that the provided systems and methods permit a Customer financial entity, if desired, to retain deposited funds on its books so that these funds can be used for normal Customer-entity activities, such as a source for loans.

It is another object that the provided systems and methods take advantage of FDIC deposit insurance in a manner that, from the viewpoint of the Clients of Customer financial entities, removes the $100,000 FDIC insurance limitation so that Client accounts may contain in excess of $100,000 and continue to be insured by the FDIC.

It is another object that the provided systems and methods permit a Customer financial entity, if desired, to structure account profitability through flexible allocation of interest income, the parameters of which may be flexibly controlled by the Customer.

Regulatory Environment of the Invention

These prior-art problems are satisfied by systems and methods structured according to a novel and creative combination of certain of financial-entity and bank regulations first noticed and assembled by the inventors. First, although accounts that require withdrawal notice are not demand accounts and therefore may earn interest, certain accounts not requiring withdrawal notice may still be deemed "savings accounts" and capable of earning interest. For example, an account that does not require withdrawal notice (but may so require at any time) is nevertheless a savings account if no more than six transfers and withdrawals are made monthly. In particular, 12 C.F.R. §204.2(d)(1) (underlining added) states:

The term savings deposit also means: A deposit or account, such as an account commonly known as a passbook savings account, a statement savings account, or as a money market deposit account (MMDA) . . . from which . . . the depositor is permitted or authorized to make no more than six transfers and withdrawals . . . per calendar month or statement cycle . . . to another account (including a transaction account) of the depositor at the same institution or to a third party by means of a preauthorized or automatic transfer, or telephonic (including data transmission) agreement, order or instruction, and no more than three of the six such transfers may be made by check, draft, debit card, or similar order made by the depositor and payable to third parties.

However, the precise types of the transfer or withdrawal transaction are critical. An unlimited number of deposits into a savings account is always allowed, and an unlimited number of withdrawals is also allowed if they are of certain limited types. Importantly, 12 C.F.R. §204.2(d)(2) (emphasis added) states:

Such an account is not a transaction account by virtue of an arrangement . . . that permits transfers of funds from this account to another account of the same depositor at the same institution . . . when such transfers or withdrawals are made by mail, messenger, automated teller machine, or in person . . . .

Taken together, therefore, an unlimited number of transfers may be made between a deposit account, that is interest-earning, and a transaction account, that permits an unlimited number of withdrawals of any type, if both accounts are in the same institution, if both accounts are in the same name, and if the transfers are made by messenger. These transfers may be into or out of the interest-earning account, which in the following will be generally be referred to as a money market deposit account ("MMDA")

Second, the $100,000 liability limitation on FDIC insurance is not determined on a per-account basis, but instead on a per-insured-institution basis, and moreover, applies to all the beneficial ownership interests that a particular ownership category (for example, a particular individual) has in the insured institution, however the accounts or instruments in which these interests are held are actually denominated. Specifically, 12 U.S.C. §1821(a)(1)(C) states the following (emphasis added):

> For the purpose of determining the net amount due to any depositor under subparagraph (B), the [FDIC] shall aggregate the amounts of all deposits in the insured depository institution which are maintained by a depositor in the same capacity and the same right for the benefit of the depositor either in the name of the depositor or in the name of any other person.

Without affecting the FDIC liability limit, ownership interests of a particular ownership category may be spread in several accounts or CDs in a single bank or may be held in a single third-party-managed account along with the funds of other ownership interests.

Therefore, the inventors have conceived and implemented arrangements whereby a single corporation, partnership, or other legal person (generally, "entity") acts as an agent of numerous individuals or other ownership interests (for example, joint ownership, ownership in trust (such as individual retirement accounts, and other legally established savings mechanisms), and so forth) to manage the funds of each ownership interest in the aggregate MMDAs in one or more Supporting financial entities so that each ownership interest's funds are earning interest while remaining FDIC insured with insurance up to $100,000 per each participating Supporting banking financial entity. Further, each Supporting financial entity, such as a bank or a saving institution, holds a single MMDA that is paired with a single corresponding DDA in the same name so that each ownership interest's use of managed funds is not limited.

A major advantage of the inventors' combination is that funds can be managed for any type of client (for example, individual, business entity, governmental entity), because there are no limitations on the type of depositor in a MMDA. Already known account management methods, require an individual account for each participating client resulting in hundreds (or even thousands) of separate accounts at supporting financial entities. Further, where these are NOW accounts, the type of client is limited by Federal banking law.

Further, since many such ownership interests hold their funds in broker/dealers, savings institutions, credit unions, or other financial entities, it is preferable that the agent entity interface to these funds-holding financial entities, and act as their agent where necessary, for the movement of managed funds between these institutions and the managed MMDA-DDA pairs. Additionally, the agency role of the agent entity also extends to a record-keeper function to a greater or lesser degree depending on the Customer financial entity. The Agent then also receives and processes account transaction information generated by all manner of financial instruments and payment vehicles, as well as simply managing the above funds transfers.

The processing for carrying out such funds management as well as any record-keeping functions is implemented by the systems and methods described in the following, where the following terms are used with the indicated meanings:

"Agent," or "Administrator/agent," or "Administrator": collectively refer to the agent entity having an agency (or trustee, or contractual, or other legal) relationship with the individual ownership interests for which it manages funds and (optionally) with the financial institutions or entities where these funds are held.

"Customer financial entity" or "Customer": collectively refer to these financial institutions or financial entities (such as broker/dealers, Investment Advisors, savings institutions, credit unions, and the like) whose client have ownership interests in the one or more deposit accounts managed by the Agents.

"Client of a Customer financial entity" or "Client": collectively refer to the ownership interests that have deposited agent-managed funds at Customer financial entities; the types of Client deposits may be, for example, individual accounts, joint accounts, trust accounts, profit or non-profit corporations, limited liability corporations, partnerships or other forms of business entities, government agencies, municipalities, ERISA accounts, non-US accounts, and the like.

"Client account": refers to the accounts in the Customer financial entities where Clients hold the funds that are managed by Agent.

"Supporting financial entity": refers to those financial entities, preferably such as banks and savings institutions, where the MMDA-DDA pairs are held by the Agent, with the MMDA being interest earning and FDIC insured (If Supporting financial entities are referred to in the following as Supporting banks, no limitations is intended.)

These terms refer to roles, and the use of different names does not imply that separate roles must be played by separate entities. For example, in certain embodiments, the Customer financial entity may be its own Supporting financial entity, or may be commonly controlled with its Supporting financial entity. In certain embodiments, the Agent itself may accept funds from its own Clients, and thus also have the role of a Customer, or the Agent may be commonly controlled with a financial entity that accepts funds and has a Customer role.

Systems and Methods of the Inventions

To accomplish these and other objectives, this invention provides systems and methods for managing a plurality of Clients of one or more Customer financial entities by administering at one or more Supporting financial entities, such as banking or savings institutions, an FDIC-insured MMDA (money market deposit account) maintained at each participating Supporting financial entity in which are held some of all of the funds in the managed Client accounts, and for managing an Agent database recording the financial information describing the managed Client balances, Client information for each Client's account, Customer information for each Customer financial entity, financial information describing each aggregate MMDA held at a Supporting financial entity, and information for each Supporting financial entity. Where Client funds are held across more than one MMDA, the funds may be insured to more than $100,000. For example, if they are held in two (or three, or four) MMDAs (each MMDA held in a different Supporting financial entity), then insurance may be $200,000 (or $300,000, or $400,000).

The Agent also acts as a record keeper for Customer financial entities by directly processing Client deposit and withdrawal transactions in each managed Client account. Processed transactions may be received directly from a wide array of sources (transaction sources). For example, for Client accounts, deposits may be received by means of various electronic and hand delivery systems, and payments may be tendered by means of various financial instruments and payment vehicles, all without limitation as to the number of transfers while interest is earned on the managed, insured Client funds. Optionally, the debiting of funds from each of the client accounts may be monitored, and debits may be authorized or rejected based upon the Client's account balance. In this embodiment, the Agent also maintains on its database records of processed Client transactions (Client deposit and withdrawal transactions), as well as financial information describing the funds managed for each Client and deposited in a MMDA at various Supporting financial entities.

In more detail, the Agent manages in each Supporting financial entity (bank or saving institution) an aggregate money market deposit account (MMDA) and an aggregate demand deposit account (DDA), both being in the identical name of the agent for its principals (referred to herein as an "MMDA-DDA pair"). In response to Client deposit and withdrawal transactions stored on the Agent's database, the Agent initiates transfers of funds between the MMDA-DDA pairs, so that if the aggregate deposits of all Clients exceed the aggregate client withdrawals (net Client credit), then all or some of the funds are deposited in the MMDA at the Supporting financial entity, and conversely if client withdrawals exceed client deposits (net Client debit) the Supporting financial entity will be instructed by messenger to transfer funds from the aggregate MMDA to the DDA.

The MMDAs are interest-bearing, insured deposit accounts, collectively in which the managed balances for all Clients of the Agent are deposited. The DDAs, which are deposit accounts permitting an unlimited number of deposits and withdrawals, serve to facilitate the exchange of funds between the MMDAs, the Customer financial entities, and sources of Client transactions (referred to herein as "transaction sources"). If the Agent determines that it is necessary to move funds from a particular MMDA (at a particular Supporting financial entity or bank), it first causes a messenger to have these funds transferred from the MMDA to the DDA member of the MMDA-DDA pair, and second, causes the funds in the DDA to be moved to the Agent's own account or accounts. Then, from the Agent's own accounts, funds may be further transferred to a $3^{rd}$ party, such as a transaction source or a Customer financial entity (preferably by electronic or other automatic means). If funds are to be moved into a particular MMDA, the Agent either may have them deposited into the associated DDA and then moved into the MMDA, or may have them deposited directly into the MMDA. The Agent database is updated to reflect these funds transfers.

In certain embodiments, where the Agent has a single MMDA-DDA pair in which all Agent-managed Client funds are held, Client liability insurance is limited to $100,000. In other embodiments, where it is preferable to provide Clients with more than $100,000 of insurance, the Agent has two or more MMDA-DDA pairs, each pair in a different Supporting financial entity, and it manages Client funds so that each Client's ownership interest at any one Supporting financial entity never exceeds $100,000. For example, when a Client's balance exceeds $90,000 (or some other operational threshold not greater than $100,000) in the aggregate MMDA at a particular Supporting financial entity, excess funds are automatically moved to a MMDA at a second Supporting financial entity. Although, Client funds may be from time-to-time be deposited at several Supporting financial entity, the accounting for this funds is preferably consolidated so that the multiple MMDAs are transparent to the investor. All Client funds exchanges and transactions may then post to a single Client account on the Agent database although the balances in this account may spread across multiple MMDAs held at multiple Supporting financial entities (represented as sub-accounts of the single Client account).

The agent also maintains sub-accounts which are attached to the client account on the Agent's database. Each sub-account represents the Client's ownership in the MMDA at the Supporting financial entities. Alternatively, the Agent may generate statements and reports for the Client showing the sub-accounts where the Client's funds are actually held and in which Supporting financial entity individual transactions occurred.

At the time a Client commences using Agent services (or, alternatively, opens a managed account with the Agent associated with an account at a Customer financial entity), the Client is given the option to choose a preferred Supporting financial entity, to chose a list of preferred Supporting financial entities in a desired (or random) order of preference, to exclude one or more Supporting financial entities, and the like. The Client may also select the order of preference for deposits and withdrawals. The Agent will then exchange funds with aggregate MMDAs on the Client's behalf, each at a different Supporting financial entity, according to the Client-supplied preferences. In the event that the Client does not supply preferences for the Supporting financial entities, the Agent may automatically designate a list of preferred Supporting financial entities (for example, as a default). Preferences for Supporting financial entities are preferably stored in the Agent database in association with Client's account information, and will be retrieved to determine which Supporting financial entity should accept or provide funds for each net Client credit or debit. Note, that the Agent automatically groups together transactions for each Supporting financial entity, and at the end of the business day, the funds are transferred either to the MMDAs or from the MMDAs via the DDA at the various Supporting financial entities. The transfer to or from the MMDA is the net transaction for all activity that occurred that day.

For example, a Client may open an Agent-managed account with $170,000, and may also indicate that these funds should be held in Supporting financial entity A and Supporting financial entity C with Supporting financial entity C preferred. Then $90,000 (or some other threshold) would be deposited into Supporting financial entity C and $80,000 into Supporting financial entity A. If a check were written or if the Client investor chose to redeem funds directly, the withdrawals would be made first from Supporting financial entity A. Withdrawals would not be made from Supporting financial entity C until all funds had been redeemed from Supporting financial entity A. Similarly, if the Client chose Supporting financial entity C as preferred, and chose to exclude Supporting financial entity. B, then $90,000 would be deposited into Supporting financial entity C and $80,000 into Supporting financial entity A.

Because the systems and methods of this invention seek to minimize risk as much as possible for its Clients and Customer financial entities, the Agent may choose a deposit cap for each of the multiple Supporting entities. For example, it is preferred that the Agent's total deposits at a Supporting financial entity are preferably no more than 10% of the total deposits at the Supporting financial entity (less preferably, no more than 20%; and much less preferably, no more than 30%). For example, if the total deposits at a particular Supporting financial entity are $1,000,000,000, then the Agent's total deposits at that entity are preferably no more than 10% of this amount or $100,000,000 (less preferably, no more than $200,000,000; and much less preferably, no more than $300,000,000).

The Client may also choose a deposit cap for each of the multiple Supporting financial entities selected, or can specify deposit caps for default Supporting financial entities chosen by the Agent. Of course, the Client may also specify that all funds be held in a single Supporting financial entity, even if the amount exceeds $100,000 (insurance being limited to $100,000 in this case). The Agent may generate statements and reports for the Client either showing only all of the managed assets and transactions as a single account, or also showing the sub-accounts where the Client's funds are held and in which Supporting financial entity transactions occurred.

In these embodiments, therefore, a Clients may earn interest on balances being managed by the Agent. These managed funds will be FDIC insured up to $100,000 per Supporting financial entity and with no withdrawal limits.

Flexible Interest Allocation

Importantly, the Agent provides the ability to flexibly allocate interest income earned by the MMDAs to each Client in a manner specified by the Customer financial entities. Generally, the Agent distributes all the interest or a portion of the interest (the remainder being applied to Agent fees) accrued by the MMDAs to individual Clients having ownership interests in the MMDAs by allocating this interest to the Agent-managed balances of these Clients. Although interest may be distributed by default in proportion to each Client's ownership interest in the MMDAs, it is more preferable for the Agent to distribute the interest as specified by the Customer financial entities. For example, each Customer financial entity may specify methods of interest allocation for its own Clients. This feature allows a Customer financial entity to relatively reward or penalize certain types of accounts in accordance with that Customer financial entity's management or marketing objectives.

Generally, a Customer financial entity specifies interest allocation methods to the Agent by providing parameters that determine a functional relationship between one or more characteristics of a Client account and an interest rate used to compute interest income on the Client's balances. The interest rate may depend on a wide variety of Client-account characteristics, such as, for example, Agent-managed balances, total Client balances at the Customer financial institution, date the Client account was opened, duration the Client has transacted business with the Customer financial entity, address of the Client account, Customer policies and promotions, and so forth. The actual functional relationship between interest rate and such Client characteristics, its parameterization, and its implementation in the Agent systems and methods may be virtually limitless. However, since the variable interest allocation is generally intended to motivate desirable Client behavior measured by one or a few key account characteristics, the interest rate will usually increase (or decrease) monotonically in dependence on the few key characteristics.

In a preferred embodiment, the functional relationship determining interest rate (for a particular Customer financial entity) is implemented largely with one or more interest rate tables. An interest rate table is known herein as a "tier set," which has one or more rows, known as "tiers." Each tier, or row, specifies at least a range for a selected, primary account characteristic along with the interest rate to be assigned to accounts when their selected characteristic is in the specified range. For example, where the selected characteristic is account balance, a tier set preferably includes tiers such that whatever its balance an account is assigned some interest rate (almost always, the higher the balance, the higher the assigned interest rate). One of skill in the art will appreciate that a selected functional relationship of account characteristics to interest rate may be implemented by a many tier sets. Because the relation between interest rate determination and tier sets is not unique, what is fundamental is the functional relation determining interest rate; a particular tier set is simply one expression of the fundamental functional relation specified by the Customer financial entity.

In one aspect of this embodiment, the Agent provides interest rates that vary as the amount of managed balances vary, generally the higher the balance, the higher the interest rate. The Agent database stores sets of tables referred to as "tier sets," each table returns interest rates (or a relative interest rate) as a function of the managed balance in a Client's account. During the process of interest allocation for a Client account, the Agent retrieves the tier set for a particular Client account, and applies the correct tier to the managed account balance to return an interest rate according to which the interest income is credited to the Client's account balance. The tier set for a particular Client account may be chosen according to information an flags stored as part of the Client information on the Agent database. The tier sets, tiers, and information for selecting tier sets and tiers may be provided by the Customer financial entity.

In another aspect, a Customer financial entity would define its interest allocation with two or more tiers forming a tier set, where the tiers are indexed by additional account characteristics. Then, given a particular Client account, a particular tier in the tier set would be selected according to the additional account characteristics, and the interest rate determined from the particular tier according to the primary characteristic of the Client account. Selection of a tier from a tier set may also depend on policies of the Customer financial entities. For example, a Customer financial entity may decide to start an interest-rate promotion using promotional tiers in the tier set. Then, the Agent would test (for example, a promotions flag in the Customer financial entity data records) to determine if promotional tier should be used to set interest rates.

Tiers in tier sets may have information in addition to a primary-characteristic range and a corresponding interest rate. For example, a tier may have a date range so that it is used to set interest rates only if the date is in the range. The date may be specified absolutely, or relatively, for example, with respect to the opening date of a Client account. Instead of specifying an actual interest rate, a promotional tier may specify an additive or multiplicative amount to be applied to a non-promotional or base interest rate.

The Agent database stores the information necessary to parameterize interest allocation and to determine an interest rate for a Client account. In the case of tiering, this database would store the tiers, tier sets, and the like among the records for the Customer financial entities. The Client account records in the database would also have information (such a flags indicating promotions) concerning account characteristics necessary for the tiering computation. Also, the Customer financial entity records may store policy flags and other data, if necessary for tier set selection.

In a concrete preferred embodiment, a Customer financial entity, such as a broker/dealer, an investment advisor, a credit union, or other financial entity, may wish to pay higher interest rates to accounts with larger balances because they are usually more profitable than accounts with smaller balances, and may also wish to run interest rate promotions from time-to-time. Accordingly, this Customer financial entity may specify a tier set with a base tier set applicable to all its Client in the absence of further indication in the account. Typically, a base tier set leads to the same interest rate for all account balances (for example, by having a single tier). The tier set would also have a standard tier set (or more than one) leading to increasing interest rates with increasing balances. Finally, there would be one or more promotional tier sets that determines the promotional interest rates. The promotion tier set may also include time information. For example, all Client accounts opened from April $1^{st}$ through June $30^{th}$ earn 5%, but after June $30^{th}$ all accounts in the tier group will default to a tier set that determines interest rates based on the balance in the account. Alternatively, the promotional tier set may specify that each account has an individual promotional period. For example, an account may earn a promotional rate for the first 60 days after it is opened at the Customer financial entity. On the 61$^{st}$ day, the account will default to a standard.

Further, in this concrete embodiment, the Client account records for the Customer financial entity in the Agent database would have one or more tier set indicators, or other flags or data, that specify which tier set to apply to this Client. Agent methods would provide the Customer financial entity with the ability to set this indicator from time-to-time so that the intended accounts will have intended interest rates.

The wide flexibility of these embodiments is illustrated by the wide choice of tier sets and of the wide choice of characteristics and factors defining particular tiers in the tier sets. For example, a Customer financial entity may select a group of clients it wishes to favor or attract. In order to expand into a new geographic area or market segment, it may wish to favor such Clients. Clients may be favored if they transact additional business with the Customer financial entity, and so forth. This Customer financial entity may then supply the agent with the favored tier set and tiers along with appropriate Client identification information so that and the selected Clients (by residence, customer type, business characteristics, or the like) will receive the targeted rates. In this manner, a Customer financial entity may even choose to reward individual Clients identified by name or account number. Further tier sets and functions may depend on variables other than the managed account balances. Such other variables may include the total amount that a Client has invested at (or on loan from) a Customer financial entity (whether or not managed by the Agent), the length of time that the Client has been transacting business with the Customer financial entity, and so forth as will be apparent to those of skill in the art.

In certain cases, a Customer financial entity's requested interest allocation may require more funds to be credited to its Clients than is generated by interest income from the Client funds managed in the MMDAs. The Customer financial entity may then be requested to transfer funds to cover this interest income shortfall. In the converse case, the Agent may transfer excess interest income to the Customer financial entity for its own use.

Agent operation for tiered interest rate implementation is flexibly programmed so that any number of tier sets, based tier sets, promotional tier sets, and tiers can be utilized with full adjustment of tier numbers, levels and time period, as selected and controlled by the Customer financial entity. The Customer financial entity may also indicate the duration of promotional tiers or interest rates and provide Client information fields and flags so that the Agent may chose the Customer financial entity's intended tier for each Client.

In other embodiments, interest rates may be determined by methods that are not table driven. The Customer financial entity may provide rules (such as "IF-THEN" rules) that the Agent will execute for each Client in order to determine the intended interest rate. The "IF" part of these rules will depend on such characteristics and indicators as are described above. The "THEN" parts may return an interest rate or link to further rules for further tests. In a further implementation, the Customer financial entity may even provide an executable module that the Agent will "call" (or otherwise execute) during interest rate allocation and that returns an interest rate suitable for each Client account.

Clearly, other embodiments that include other combinations of the basic features of this invention may be appropriate for other Customer financial entities. This invention would be understood by one of skill in the art to include such other embodiments.

BRIEF DESCRIPTION OF THE DRAWINGS

The present invention may be understood more fully by reference to the following detailed description of the preferred embodiment of the present invention, illustrative examples of specific embodiments of the invention and the appended figures in which.

DETAILED DESCRIPTION OF THE PREFERRED EMBODIMENTS

Figure 1A:
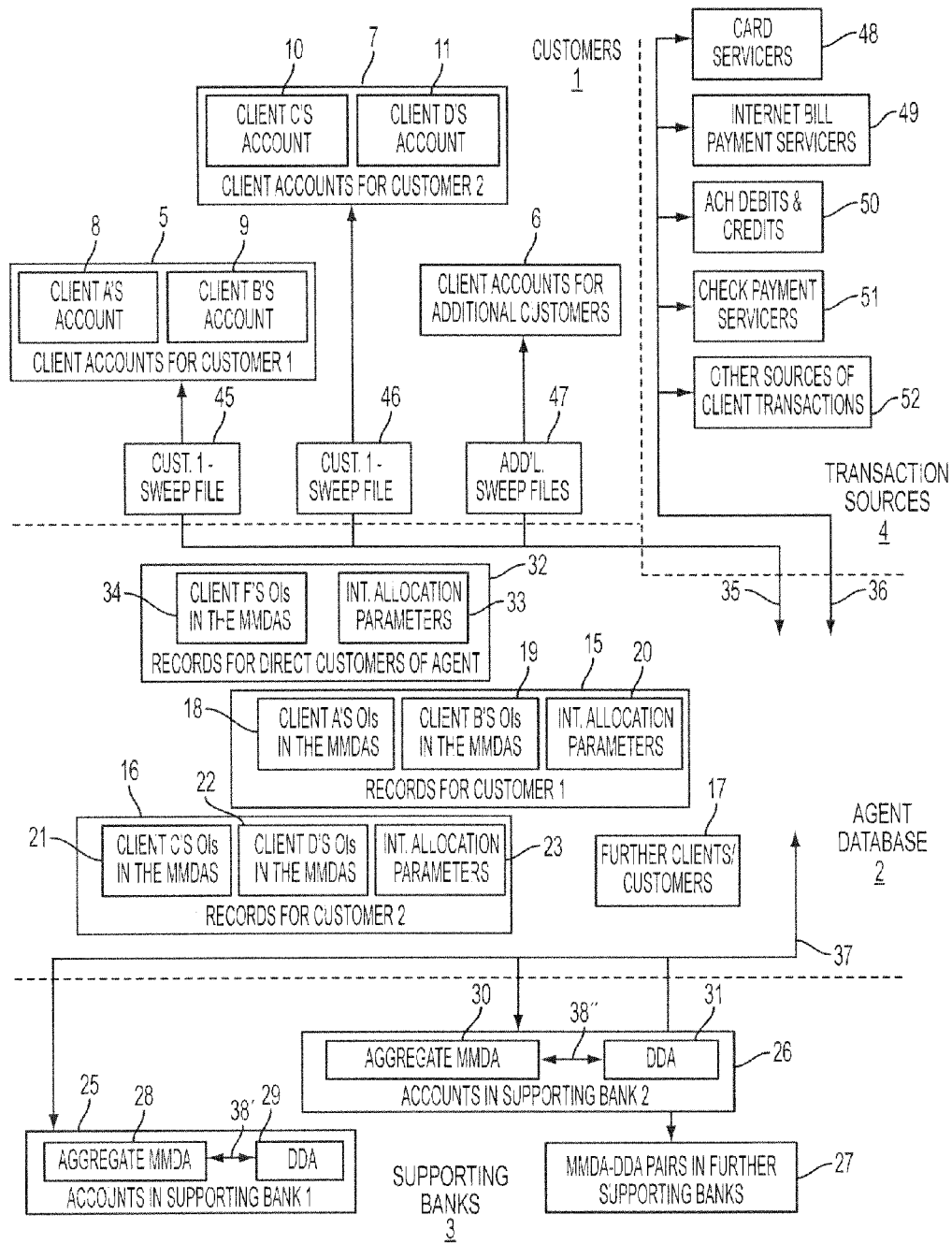
FIG. 1A illustrates an exemplary embodiment of accounts, funds flows between accounts, and database records managed by the Agent, where MMDA refers to money market deposit account, where DDA refers to demand deposit account, and where OI refers to ownership interests of Clients in the MMDAs

Described next are specific preferred embodiments that are within the general scope of the invention as set forth in the preceding section. This description includes preferred details of the Agent-managed accounts and funds transfers, preferred interest allocation methods, and exemplary processing methods and systems.

Next, for convenience and clarity, the following terms used in the present specification have the following meanings. First, the term "financial institution" (and "participating financial institution") refers to institutions that may participate in the present invention by virtue of having certain preferred characteristics. One characteristic is that participating financial institutions offer accounts against which customers may make a variety of deposit and withdrawal transactions, where different types of participating institutions may offer customers different types of transactions. Another preferred characteristic is that a participating financial institution offer interest-bearing, insured MMDA-type accounts, or be associated in some fashion with a financial institution that does offer such accounts. Such MMDAs are generally offered by banks, and because the present invention manages participating customer accounts by investing their funds in one or more MMDAs, a participating financial institution derives greater benefit from the invention if it receives some value for these MMDA investments by being associated with one or more banks holding these MMDA investment accounts. In particular, banks may be participating financial institutions and receive direct benefit from the methods of the present invention by both offering customer accounts and providing MMDAs for investment, which may be available according to this invention as deposit accounts for other participating financial institutions. Also, broker/dealers, investment advisors, insurance companies, and so forth that may be participating financial institutions. Here, the funds of the customer accounts are invested in MMDAs in a bank designated by participating institution. A designated bank may not have any particular affiliation with the designating financial institution, or may be affiliated or associated in manners known in the art (for example, a corporate entity with a banking subsidiary and a broker/dealer, an insurance, or an investment advisory subsidiary, or a bank or bank holding company with a broker/dealer subsidiary, or so forth).

Therefore, generally, the term financial institution refers to all such preferred institutions with any banking association or affiliation permitted by law and regulation. However, for convenience and clarity but without limitation, the following description is often in terms of embodiments where participating institutions are banks holding both customer accounts and the investment MMDAs. If some participating customer accounts are in, for example, a broker/dealer, it is to be understood that the associated MMDA-DDA pair is held in the affiliated or associated bank. Also, where customer accounts are referred to in the banking embodiment as DDAs, it is also to be understood that in general customer accounts may also be broker/dealer accounts, investment advisory accounts, and so forth.

Figure 6:
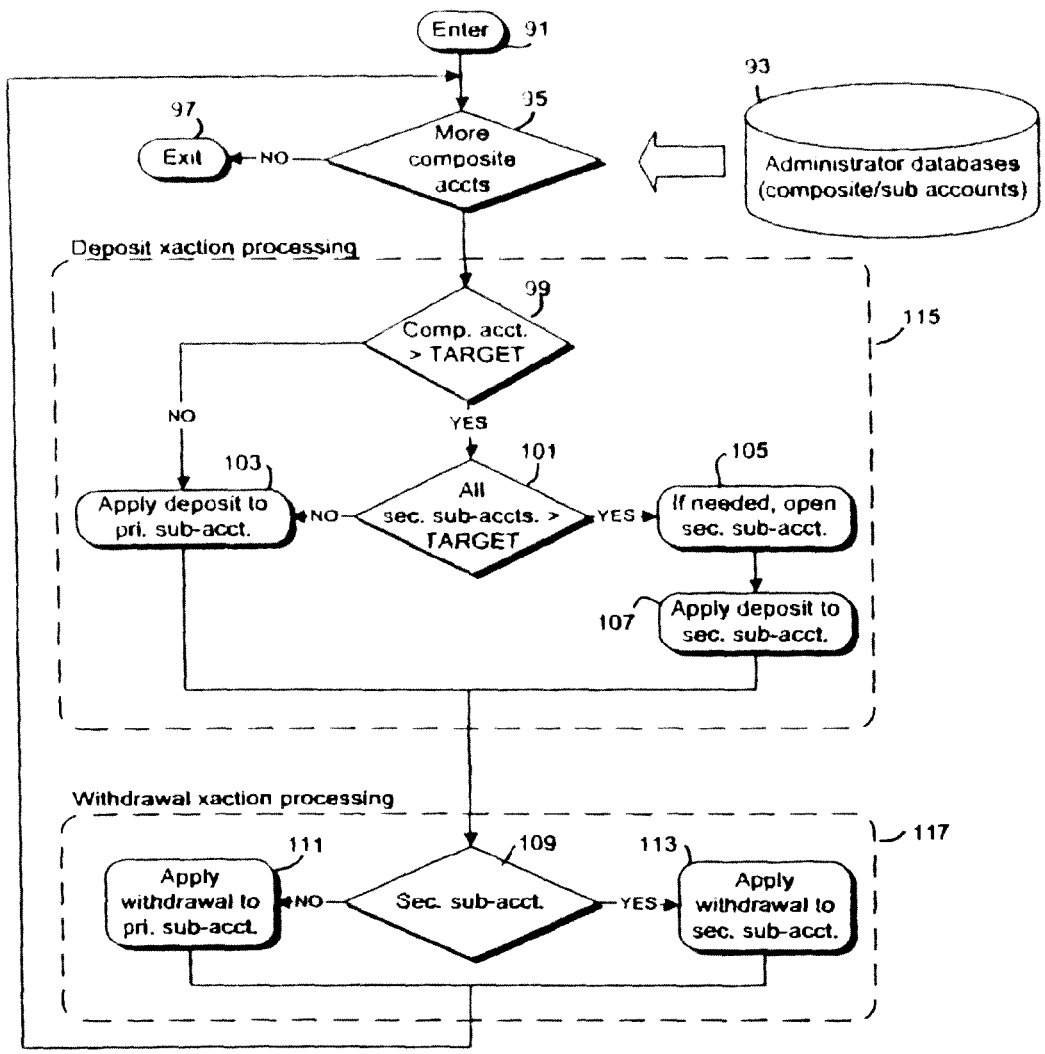
FIG. 6 illustrates post-to-sub-account steps of the periodic processing of this invention.

Further, it may happen that a customer has secondary sub-accounts at all secondary institutions none of which are capable of receiving the new deposit without exceeding the target coverage amount. In this case, in those embodiments where it is preferred to retain a customer's deposits in the customer's primary institution, the left-hand branch from test 101 of FIG. 6 is taken, and the new deposit is allocated 103 to the primary sub-account. On the other hand, in those embodiments where it is preferred to distribute a customer's excess balance (over the target amount times the number of participating financial institutions) among the secondary institutions (or banks) to reduce risk, processing will branch from test 101 to allocate the new deposit to that secondary sub-account 107 having the smallest existing balance or to the primary sub-account 103 if that account has the smallest current balance.

Using this account structure, preferred methods for allocating participating customer funds among the participating banks are now described, commencing with the rules and objectives which guide funds allocations and followed by a preferred implementation of these rules and objectives.

Participating customer funds are generally invested according to a process which implements a number of rules in order to satisfy to the extent possible the goals and objectives of this invention. These rules are generally divided into primary rules and secondary rules. It is highly preferable that any allocation of participating funds always satisfy the primary rules. However, depending on the number of customers, the size of their participating funds, their primary banks, and so forth, no allocation of participating funds may be possible which satisfies both the primary and the secondary rules. In these situations, it is preferred that the secondary rules be satisfied to the extent possible.

In preferred embodiments, funds investment or allocation is guided by two (a first and a second) primary allocation rules and by one or more secondary allocation rules. The first primary rule, advantageous to participating customers, is to allocate a customer's participating funds among the MMDA-DDA pairs in order that the customer receives the maximum possible deposit insurance. This is achieved by never allocating a customer's participating funds so that a bank has more than the target amount when another bank is allocated less than the target amount. If the total amount of a customer's participating funds is equal to or less than a maximum insurance threshold, which is equal the target amount (or less preferably, the actual FDIC-maximum-coverage amount) times the number of participating banks, then all that customer's funds can be covered by deposit insurance. In the contrary case, where a customer's participating funds exceed the maximum insurance threshold, then one or more banks must hold more than the target amount of that customer's funds. In both cases, this first primary rule allocates funds so that the each customer's deposit insurance coverage is maximized.

The second primary rule is to allocate all participating funds so that each bank has on deposit an aggregate amount of funds equal to that bank's participating funds, whether or not the deposited funds are owned by customers of that bank. Stated differently, the total of the funds of all participating customers at a participating bank is considered herein as that bank's aggregate or total participating funds. If the funds of one or more customers must be transferred to other participating banks for insurance coverage according to the first primary rule, then according to this second primary rule an equal amount of funds should be transferred from other banks to this bank in order to maintain this bank's aggregate funds on deposit. This rule is advantageous to participating banks, especially smaller banks, because a bank's aggregate deposits can be sources of income, for example, by being available for loans.

Processing of these primary allocation rules by the methods of this invention provides participating banks with the ability to provide increased FDIC insurance over the $100,000 coverage limits to their bank and/or brokerage customers by allocating and investing their participating customer's balances in excess of $95,000 (or other target amount) in interest bearing deposit accounts at other banks. The bank does not lose deposits held on its balance sheet, since it receives reciprocal deposits, equal to deposits transferred out, transferred in from other banks participating in this invention. For example suppose bank A has a customer account with a balance of $300,000. Because FDIC Insurance covers only the first $100,000 of this balance, by dividing the additional $200,000 equally between bank B and bank C, bank A can provide this customer with full FDIC coverage. Since bank A does not want to lose the $200,000 in deposits, the methods of this invention will transfer to bank A $200,000 in deposits from other participating banks (perhaps, but not necessarily, banks B and C).

Steps 57 and 59 of FIG. 6 are the heart of the regular funds allocation process. Step 57 first posts all received customer transactions to customer composite accounts, and then allocates the posted transactions to customer sub-accounts in a manner that provides full deposit-insurance coverage (or a maximum of coverage if full coverage is not possible). After step 57, although the first primary rule is satisfied, the second primary rule may not be satisfied: one or more individual participating institutions may have total aggregate deposits that are more or less than the participating deposits of the own customers (referred to as "out of balance"). Accordingly, step 59 reallocates funds in customer sub-accounts among the participating institutions to insure that the institutions are brought into balance. After transaction allocation processing of step 57 and sub-account re-allocation processing of step 59, instructions are generated 60 and transmitted to cause transaction settlement and funds transfer between participating institutions. Regular processing terminates at step 61.

In alternative embodiments, the principal steps, receiving transaction data, allocating transactions, and re-allocating sub-account funds, may be performed in different orders. For example, if the participating institutions may tolerate being out of balance to a certain degree, then receiving transaction data and allocating transactions may be repeatedly performed 63 in a regular fashion as above while sub-account-fund reallocation is performed only when the out of balance condition exceeds the tolerable degree.

Generally, although transaction allocation as described achieves the deposit-insurance-coverage objectives of this invention, it may leave the participating banks or financial institutions out of balance. The second primary objective is that each participating bank be in balance, that is where with the total aggregate of the deposits allocated to each bank equals the total participating deposits of the customers of that bank. The total deposits allocated to a bank equals the sum of the balances of all sub-accounts allocated to and held by that bank, whether or not the sub-accounts are associated with customers of that bank; the bank's total participating funds equals the sum of the balances of the composite accounts of all the customers of that bank. It is convenient in the following to use the term "net_difference" to stand for the difference of these two sums, namely, the sum of the composite account balances subtracted from the sum of the balances of the allocated sub-account balances. Then a bank is said to be in surplus if its net_difference is positive; a bank is in balance if its net_difference is substantially zero; and a bank is in deficit if its net_difference is negative.

Finally, Table 7 illustrates determination of the surplus/deficit status of the participating bank and the funds re-allocation needed (assuming the banks were all initially in balance). For example, Bank C has experienced a $3M increase in aggregate participating deposits, because $3M in customer transactions were allocated to it as indicated in Table 5. However, Table 6 indicates that the customers of Bank C generated $6M in net deposits. Therefore, Bank C has a negative net_difference, or deficit, of $3M; $3M needs to be transferred into Bank C from Banks A and B so that its aggregate deposits equals the aggregate deposits of its customers. Similar interpretation of the results for Banks A and B indicate that Bank A remains in balance while Bank B has a positive net difference, or surplus, of $3M. All the banks will be in balance again after a funds transfer of $3M from Bank B to Bank C.

TABLE 7

|  | BANK | | |
| --- | --- | --- | --- |
|  | A | B | C |
| Aggregate bank deposits on previous day | $100M | $50M | $30M |
| Change in sub-accounts attached to the bank at end of this day (= net transactions allocated to this bank) | $8M | $6M | $3M |
| Change in aggregate deposits of all customers of this bank (= net transactions of all customers of this bank) | $8M | $3M | $6M |
| Status (net_difference) | Balanced | Surplus of $3M | Deficit of $3M |
| Re-allocation needed | $0 | ($3M) | $3M |

In summary, funds re-allocation is usually needed because the net transaction balances allocated to a bank usually does not equal the net transaction balances of the bank's customers (or customers of its affiliated or associated participating financial institution).

Figure 5:
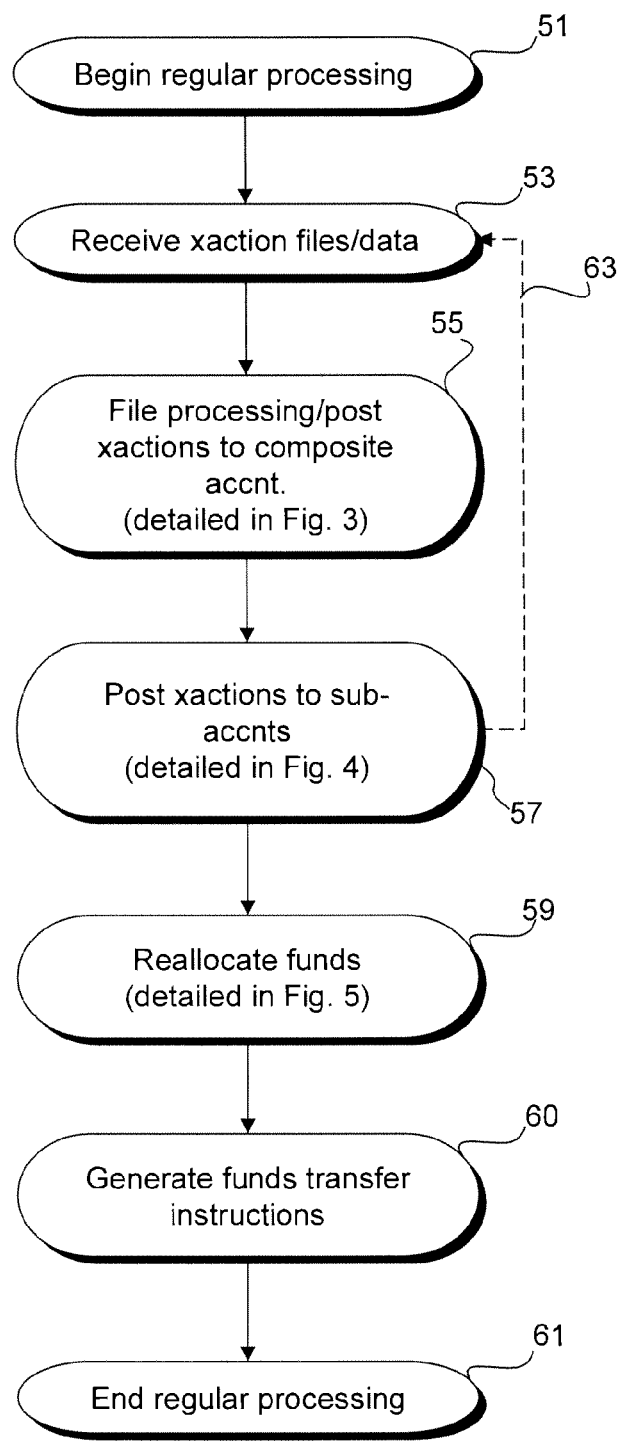
FIG. 5 illustrates periodic processing performed by this invention.
Figure 7:
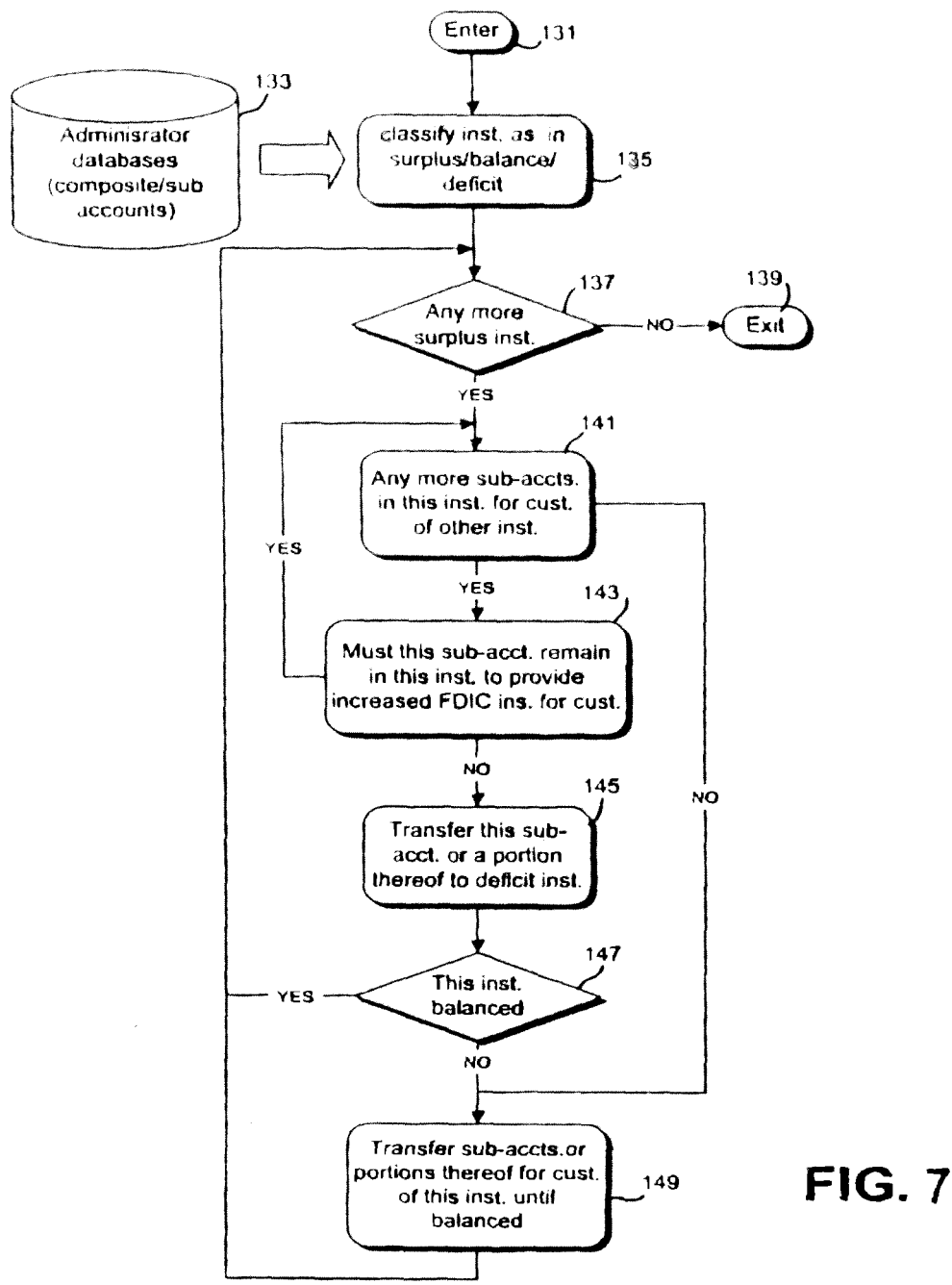
FIG. 7 illustrates re-allocation-processing steps of the periodic processing of this invention.

Now returning to this invention's processing methods, FIG. 7 illustrates funds re-allocation processing, step 59 (FIG. 5), in more detail in view of the prior example. After commencing 131, classification step 135 retrieves data from administrator databases 133, which store composite account and sub-account records, and classifies all participating financial institutions (for example, participating banks) as being in surplus, in balance, or in deficit according to the net_difference definition above. This classification is processed in a fashion analogous to the exemplary classification of Banks A, B, and C in the prior example. After surplus/balance/deficit classification 135, re-allocation processing determines 137 if there are any institutions are in surplus. Processing exits 139 if no further institutions are in surplus, because if there are no institutions in surplus, then all institutions are in balance. Any institution that is in deficit means that there are one or more other institutions in surplus, and conversely. (Similarly, processing may determine if there are any institutions in deficit.) However, if at least one institutions is still in surplus (and thus one or more are still in deficit), re-allocation processing must continue.

Re-allocation processing seeks to transfer sub-account balances from surplus institutions to deficit institutions until all are in balance. Secondary sub-accounts are preferentially transferred out of a surplus institution to a deficit institution; however, if transfer of all secondary sub-accounts does not achieve balance, then primary sub-accounts, that is sub-accounts for customers of the surplus institution, are also transferred. Therefore, processing next finds 141 secondary sub-accounts at a surplus institution (which it should be recalled are sub-accounts for individuals who are not customers of that surplus institution). Certain secondary sub-accounts are "fixed," and may not be transferred to an in-deficit institution. For example, a candidate secondary sub-account may not be transferred if transfer of part or all of its current balance will decrease insurance coverage for that sub-account's owner. This will occur, for example, if the existing balances of that customer's sub-accounts at the currently in-deficit institutions are too close to (or are at) the target amount, and cannot accommodate funds from the candidate secondary sub-account. Test 143 bypasses all such "fixed" sub-accounts.

Transfers of funds preferably are determined to leave the financial institutions exactly in balance with a net_difference of zero. However, in certain embodiments it may not be possible to exactly balance institutions because of, for example, funds transfer restrictions, timing differences between transaction processing and funds transfer, and the like. In such embodiments, financial institutions should be substantially in balance by having the net_difference to be no more than 5%, or 2%, or 1%, or 0.5%, or 0.1% of the total customer account balances.

Figure 8:
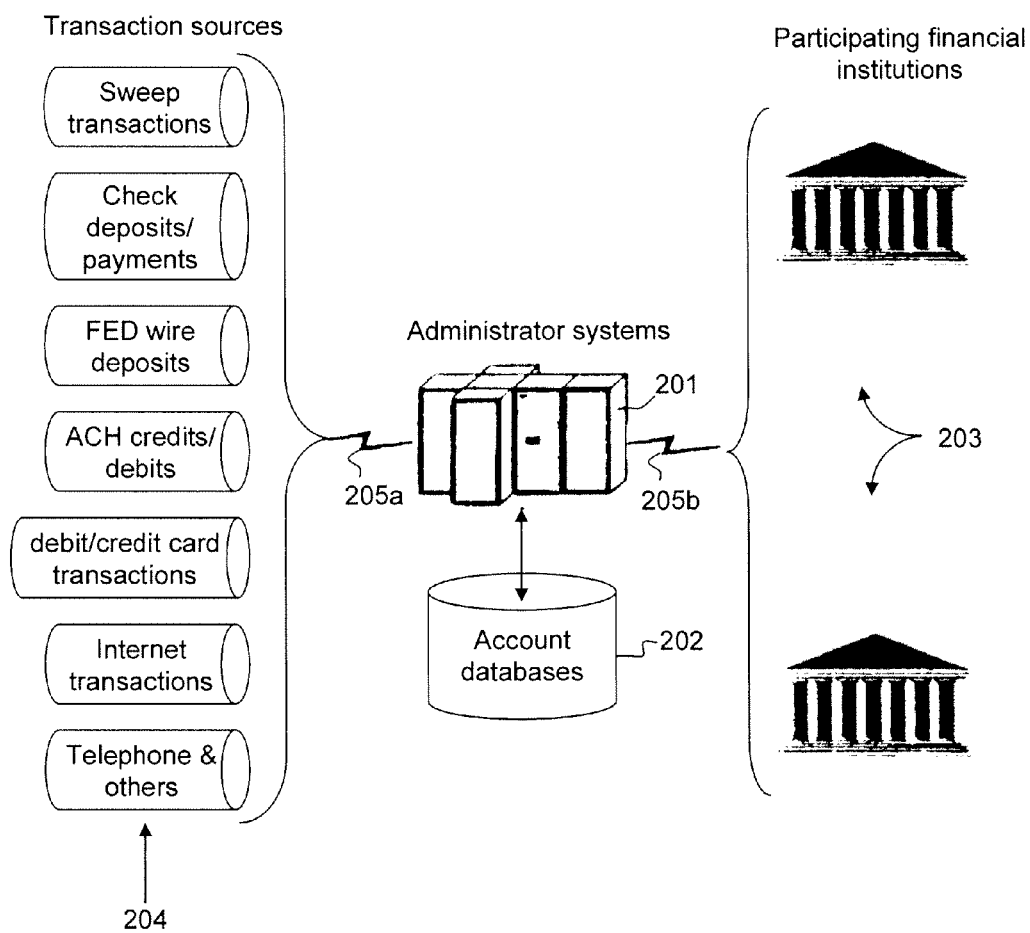
FIG. 8 illustrates exemplary systems for practicing the present invention.

FIG. 8 generally illustrates exemplary administrator systems of this invention, which, along with certain external system with which the administrator systems cooperate, are for performing the above-described methods of this invention. Computer system 201 of FIG. 8, including processing unit, memory, communication interface, user interfaces, and the like, is configured with a performance and reliability acceptable for financial processing as is known in the arts. For example, such computers along with industrial-strength operating software are available from IBM and other well known manufacturers. Administrator systems also include database storage 202 of FIG. 8, preferably highly reliable, for storing account data, including composite account data, sub-account data, MMDA-DDA account-pair data, and such other administrative data needed for customer funds management.

Agent-Managed Accounts

FIG. 1A is a exemplary general embodiment of the financial relationships and legal relationships (contractual, agency, and the like) that are present in this invention. Centrally illustrated in FIG. 1A are Agent and Agent database 2 with exemplary records 18, 19, 20, 21, 22, 23, 32, 33, and 34. Records 18 and 19 are for Clients of Customer financial entity 1, and record 20 holds the interest allocation parameters prescribed by that Customer financial entity. Similarly, the Agent database stores Client records 21 and 22 and interest allocation parameter record 23 for Customer financial entity 2. In various embodiments, the organization sponsoring the Agent, or an organization commonly controlled with the Agent organization, may have its own direct clients with Agent-managed accounts. Hence, also stored are Client record 34 and interest allocation parameter record 33 for direct Clients of the Agent. Finally, records 17 are Agent database records for further Customer financial entities.

It will be understood that certain non-essential aspects illustrated in FIG. 1A (and in the other figures) are for convenience of illustration and are not to be taken as limiting. Thus, while records 15 for Customer financial entity 1 (and records 16 for Customer financial entity 2, and records 32 for the Agent's direct Clients) are illustrated as grouped, they may be structured in an actual Agent database in any convenient manner known in the art. Also, although each of the records is illustrated by a single block, this information may be actually stored in any number of logical or physical records.

Next, exemplary Customer financial entities are illustrated in the upper left section of FIG. 1A. Accordingly, Customer financial entities 5 and 7 have respective Client accounts 8, 9, 10, and 11. Client A has account records 8 and corresponding Agent records 18; and similarly Client B has records 9 and 19; Client C has records 10 and 21; and Client D has records 11 and 22. There will usually be further Clients and Customer financial entities 6 with corresponding Agent data 17. Records of direct Agent clients, such as record 34, combine both Customer-like information with Agent-like information. Although the Agent may appear to Clients of Customer financial entities as a bank-like financial entity, it is not actually a bank and holds no funds. All Agent-managed funds are held in money market deposit accounts in Supporting financial entities banks. Thus, illustrated in the bottom section of FIG. 1A is exemplary Supporting bank 25 with MMDA 28 linked to DDA 29, and exemplary Supporting bank 26 with its MMDA 30 linked to DDA 31. An embodiment may use additional Supporting banks 27. As illustrated, each Supporting financial entity holds a single MMDA and a corresponding DDA.

Further, the Agent exchanges funds and information with one or more, and usually several, transaction-processing financial entities illustrated in the upper right segment of FIG. 1A. It is by means of these transaction-processing financial entities, which preferably service many of the transaction vehicles provided by modern financial services, that Clients may access their Agent-managed funds for deposits and withdrawals. FIG. 1A individually illustrates several significant transaction sources. Thus, card servicers 48 represents credit and debit card processing organizations and networks. Internet bill payment servicers 49 represents service providers for bill payment, checks, and funds exchanges generally by means of the Internet (or other electronic or network means). ACH debits and credits 50 represents various direct deposit and withdrawal clearinghouse services. Check payment servicers 51 represent debit and credit transactions generated by paper check processing. Because these individually illustrated transaction sources are illustrative and not limiting, other transaction sources 52 represents transactions generated as a result of other payment vehicles (such as touch-tone bill payment). Accordingly, Clients may access their Agent managed funds by credit and debit cards, for Internet transactions, by direct deposits and withdrawals, by checks, and by other payment and funds exchange vehicles.

Various embodiments of the invention may provide more or fewer transaction sources as well as transaction sources of different types (or of types yet to be developed). In other embodiments, one or more (up to all) transaction sources may interface with the Customer financial entities, which then provide summary information to the Agent via the illustrated sweep files. For example, in the case of broker/dealers, investment advisors, and the like, securities transactions may be processed directly by these Customer financial entities. In this embodiment, the Agent may directly interface with only a few or no transaction sources.

Lastly, FIG. 1A illustrates information and funds exchanges present in general embodiments of the invention that are between the Agent and these financial entities that cooperate to provide the Agent-managed accounts of this invention. Exchanges 36 are between the Agent and the transaction sources. These transaction sources typically package a day's transactions in transaction files which are transmitted daily to the Agent. The Agent causes necessary funds' exchanges by, for example, wire transfers between Agent accounts and the transaction-source financial entities. Exchanges 35 are between the Customer financial entities and the Agent, and are usually implemented by exchange of sweep files, such as sweep files 45, 46, and 47. These sweep files usually have instructions for funds transfer between the Agent and its Customer financial entities along with summary transaction information. Funds transfers here are also typically implemented by wire transfers between Agent accounts and the Customer financial entities.

Finally, exchanges 37 are between the Agent and its Supporting financial entities (banks and savings institutions). These (usually) daily transfers preferably balance the net results of all prior Customer financial entity and Client transaction activity exchanges 35 and 36 by making necessary deposits or withdrawals at the Supporting financial entities. Importantly, the Agent causes withdrawals by, inter alia, generating instructions for a messenger to have the Supporting financial entities move funds from their MMDAs to their corresponding DDAs.

As illustrated, the Agent in generally central in these information and funds exchanges, receiving and processing transaction data and then causing necessary funds transfers.

For each Client account at a Customer financial entity participating in Agent services, the Agent tracks managed funds by storing one or more database records (representing "accounts") with financial information describing the Client funds being managed by the Agent. As illustrated, Client A's account 8 and Client B's account 9 at Customer financial entity 1 correspond to stored records 18 and 19; similarly, Client C's account 10 and Client D's account 11 at Customer financial entity 2 correspond to stored records 21 and 22. This financial information describes, at least, each Client's ownership interests ("OIs") in the MMDA at each Supporting financial entity, that is the amount of that Client's funds held in each MMDA, along with the total funds being managed for that Client (namely, the sum of the MMDA OIs). The Client records also preferably store information representing basic Client identifications, such as name, address, social security number, and the like, information representing Customer financial entity association, such as Client account number at the Customer financial entity, Client characteristics at the Customer financial entity important to Agent management, and the like, and additional Client related information (not illustrated).

The Agent database also preferably additionally stores records describing the Customer financial entities, such as records 15 and 16. These stored records represent at least Customer financial entity identification and such other information as the Agent needs to manage the Customer financial entity's Clients, including importantly parameters provided by the Customer financial entity to guide interest allocation. Thus the records describing Customer financial entity 1, records 15, include its interest allocation parameters and instructions 20, and those for Customer financial entity 2, records 16, include its interest allocation instructions 23. Where interest is allocated according to tier sets and tiers, the interest allocation records described the Customer-financial-entity-defined balance balance-tiers and associated interest rate, both of which may be changed by the Customer financial entity from time-to-time. Although FIG. 1A illustrates all the records for the individual Customer financial entities being grouped together, actual implementation of the Agent database may organize and physically store records in any manner convenient.

To meet statutory and regulatory requirements, the Agent provides Clients through the Customer financial entities with information describing their accounts and their transactions held on the Agent's database. The Customer financial entity may decide to incorporate this account information into their statements to the client, or to have the Agent produce a separate statement. Thus, all activity sweeps, checks written debit/credit card transactions, and so forth appear in the account in the Clients' accounts as well as in the sub-accounts for the Clients when more than one supporting financial entity is used to provide FDIC insurance over $100,000. Although detail of these sub-accounts may or may not be reported to the client (at the option of the Customer financial entity), the Agent preferably provides the Clients at least with the balances held in each pooled MMDA at each Supporting financial entity.

Next, Client funds for which the Agent is responsible are managed at one or more Supporting banks (financial entities) 25, 26, and 27 in a manner to both qualify for FDIC insurance, limited to $100,000 per individual beneficial interest per Supporting financial entity, to earn interest, and to permit unlimited withdrawals. To satisfy regulatory requirements, each Supporting financial entity holds a pair of accounts, one account being an interest bearing money market deposit account (MMDA) in which all Client funds are deposited, and the other account being a demand deposit account (DDA) registered in the identical name as the first account (ex., "Administrator as agent for Clients"). For funds transfers from Supporting financial entities, the Agent, first, provides instructions to a messenger who personally requests the withdrawal from the MMDA to the associated DDA in a Supporting financial entity. Funds may then be wired from the DDA out of the Supporting financial entity by the Agent to cover client withdrawals from various sources. Transfer into the pooled MMDA may be direct or through the pooled DDA as dictated by operational convenience. As illustrated, Supporting bank 25 has linked MMDA 28 and DDA 29 between which the Agent exchanges funds 38'. Similarly, the Agent exchanges funds 38" between MMDA 30 and DDA 31 in Supporting bank 26.

Agent-Managed Funds Transfers

Generally, in this invention, the Agent receives actual funds from various financial entities and wires funds out to various financial entities, namely, the Customer financial entities 35, the Supporting financial entities 37, vendors (also referred to as transaction sources) that provide services for the Clients 36, and also direct Clients of the Agent that are not associated with any Customer financial entity. The Agent receives funds from various sources, such as sweep purchases of Clients at Customer financial entities, checks, wire transfers, ACH incoming transactions for, e.g., Client payroll and Client social security deposits, into a subscription account (or several subscription accounts) for further credit to the client's account as a deposit. These funds (after being netted against Client debits) are then to be deposited into the Supporting financial entity. The Agent also sends funds from the subscription account or accounts to pay for various types of withdrawals, such as on-line bill payment capabilities for Clients, ACH debits received from other banks at Clients' requests, touch-tone bill payment, and so forth. Further, the Agent may send funds for checks presented for payment against the Client accounts and for card transactions.

In more detail, the Agent determines the amounts of actual funds to transfer as a result of processing transactions received during its financial processing cycle (usually daily, but other periods known in the art may be used). One important source of transactions are vendors that provide payment services (both credits and debits) for the Clients and that periodically (e.g., daily) forward files to the Agent containing accumulated transactions of the Clients of the Agent (illustrated as Transaction sources 4 in FIG. 1A). Services provided by such vendors include processing of credit and debit cards, ACH credits and debits, Internet bill payments, check payments, and of other types of transaction known in the art. These transaction files are processed, preferably when received (in real-time), by the Agent to update the net credits and debits for each Client, and also the net credits and debits for each Customer financial entity in view of its Clients' net activities.

Another important source of transactions are sweep transactions received in sweep file forwarded from the Customer financial entities. Where Client transactions made at a Customer financial entity in a certain period generate net credits, the Customer financial entity may sweep excess Client funds to the Agent. In case of the converse, where Client transactions generate net debits at the Customer financial entity, this entity may request funds from the Agent to cover such debits. Alternately, funds may be swept to or from the Agent when funds in Client accounts at Customer financial entities exceed or fall below, respectively, a desired or target minimum balance, which may be the same for all the Customer financial entity's clients, or may vary among the Clients. Sweep files may optionally also summary or detailed information on the subject Client transactions. The Agent also processes sweep files in real-time to update the net credits and debits and for each Customer financial entity (for each Client if the sweep file contains the necessary information).

Resulting from this transaction processing are final net credits or final net debits due at each Customer financial entity and at each service vendor that provides a transaction file. The Agent may cause these net funds to be transferred by wire or other means at any time after the final nets are determined. Next, the resulting final net Client credits or net Client debits are allocated among the MMDAs. Where an embodiment manages only a single MMDA at a single Supporting financial entity, then all the net Client credits and debits are netted to a final amount to exchange with this Supporting financial entity. Where several MMDAs are managed at different Supporting financial entities, the final net Client credits or net Client debits are allocated among the available MMDAs according to preferences stored in the Client database records. These allocated amounts for all the Clients are then netted to obtain the final amounts to exchange with each of the Supporting financial entities. Funds transfers with the Supporting banks are managed as described above (with messengers for withdrawals) in order to satisfy regulatory requirements.

Concurrently, the Agent database is updated with information in the received transaction files so that it may track deposits to, and withdrawals from, each of the Client accounts at the Customer financial entities, Customer sweep activity, and the like. The database is further updated with net credits and net debit information and with funds transfer information, as well as with each Client's current proportionate and/or monetary share in the MMDAs.

Preferably, the foregoing procedures are structured in a manner so as to permit broker/dealers, savings institutions, credit unions and other Customer financial entities to continue servicing their Clients as they have done in the past with minimum disruption to their existing processes and systems. In this manner, the invention would be virtually transparent to presently-existing financial entities, and Customer financial entity personnel would not be burdened with the requirement to perform unfamiliar and potentially time-consuming procedures.

Methods of Interest Allocation

Figure 1B:
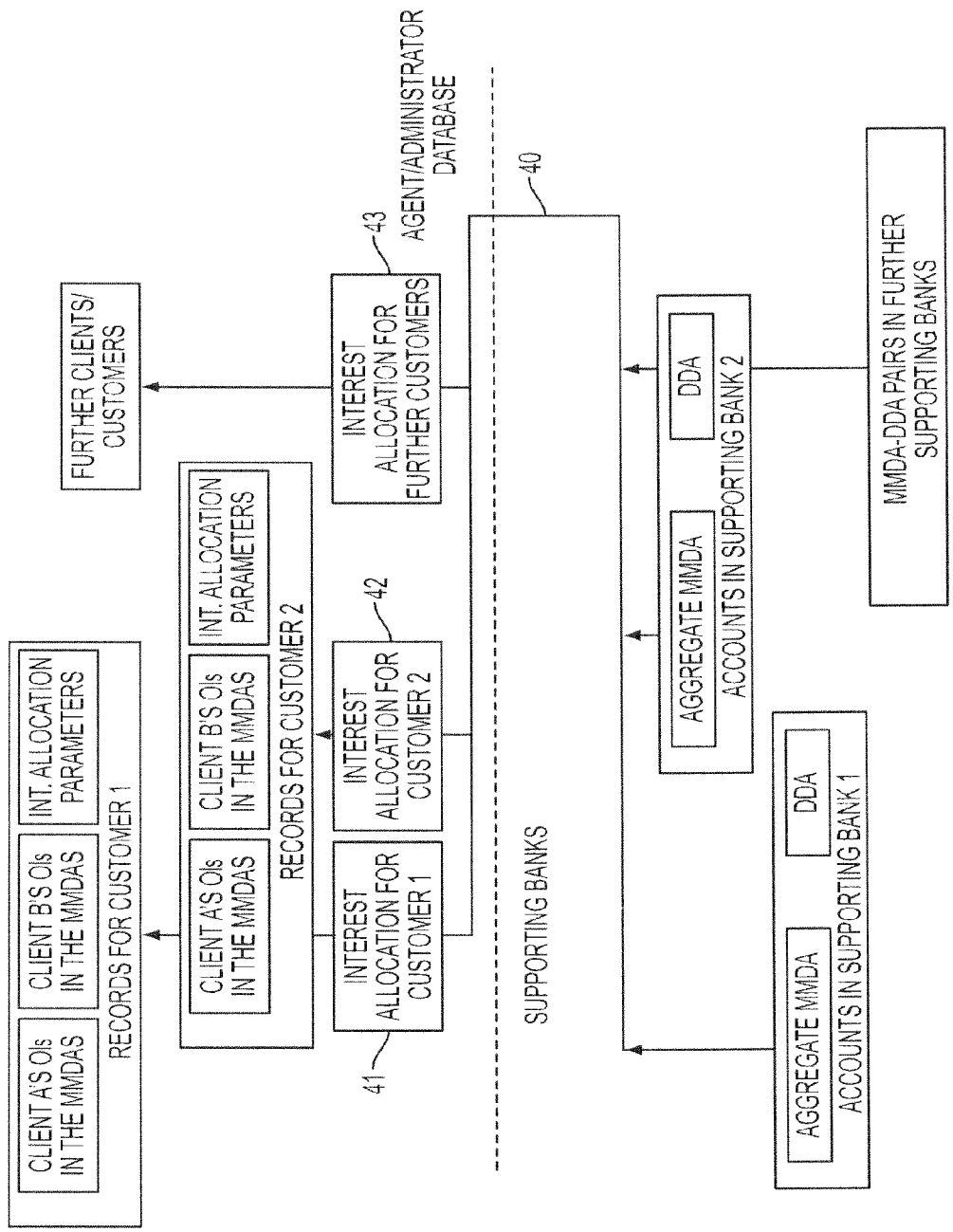
FIG. 1B illustrates an exemplary embodiment of interest allocation in the invention.

As the MMDAs at the various Supporting financial entities accrue interest, all or a portion (for example, interest less Agent fees) of this interest is distributed to individual Clients. FIG. 1B, which is identical to FIG. 1A except that funds exchanges 35, 36, and 37 of FIG. 1A are absent and interest distribution 40 is present, details this important Agent function. Each pooled (or aggregate) MMDA preferably earns a maximum interest return compatible with its insured status, which is credited by the Supporting financial entity to the MMDA. The Agent then distributes ownership of accrued interest to the ownership interest ("OIs") of individual Clients which are recorded in the Client records in the Agent database. In FIG. 1B, this interest distribution (also referred to herein as "interest allocation") is illustrated by multiple-headed arrow 40 linking the MMDAs, where the interest is accrued, to the Agent database records, where the interest is accounted for by increases in the Client OIs. This function does not necessarily involve actual funds transfer, because the distributed interest is accrued periodically in the Client's accounts and may be withdrawn according to the funds exchanges illustrated in FIG. 1A in response to debits in Client accounts.

Interest allocation, or distribution, may be performed by several methods. In a simple method, interest earned by an MMDA is proportionally allocated to the Clients according to the relative OIs in that MMDA. It is preferable, however, to allocate interest flexibly and especially in response to requests of the Customer financial entities. Accordingly, FIG. 1B illustrates that interest for the Clients of Customer financial entity 1 are allocated according to allocation methods 41; interest for the Clients of Customer financial entity 2 are allocated according to allocation methods 42; and further Customer financial entities may request further allocation methods 43. These allocation methods may simply be based on relative OIs (optionally, the Agent's default allocation method), or may be procedures provided by the Agent but parameterized by the Customer financial entities, or may be provided as a complete allocation procedure by the Customer financial entities. Depending on the Customer financial entity's chosen allocation method and the distribution of Clients of the Customer financial entity, the Agent may distribute an amount of interest that does not equal the interest returned from the MMDAs for this Customer financial entity.

The total amount of interest to be allocated to all the Clients of a single Customer financial entity (the Customer financial entity's share of the interest) is usually set to be the proportionate to those Clients' share of the total interest earned by the MMDAs. The Customer financial entity's allocation method then allocates that total among the Customer financial entity's Clients. It may happen the Customer financial entity's chosen allocation method distributes more or less than that Customer financial entity's share. In this case, excess interest may be transferred to the Customer financial entity and deficits requested from the Customer financial entity. Optionally, the Agent itself may allocate interest among its Customer financial entities in an other-than-proportionate manner in order, for example, to encourage Customer financial entities to provide more Clients for the Agent.

Advantageously, interest allocation methods may be further customized to meet Customer financial entity marketing needs, such as acquiring new deposits, encouraging larger deposits, and so forth. Broker/dealer customers would find this facility especially advantageous because statute and regulation have prevented them from offering interest incentives in the past based on money market mutual funds.

A preferred incentive allocation is based on "tiering," that is assigning interest rates to Clients based on their Agent-managed balance (or other Client account parameter that a Customer financial entity seeks to incent). First briefly in overview, interest allocation features of the present invention are selectively enhanced by system control of tiered interest rate allocations ("TIRA"). As noted above, Client account balances managed by the Agent are tracked on a periodic e.g. daily basis. TIRA methods tests the then current account balance for each Client having funds under Agent management. Based on the ascertained balances, the Client account is placed in one of two or more available tiers (where a method with a single tier implement a single interest rate for all accounts), with the selected tier level corresponding to the appropriate interest rate to be paid on that account balance during the deposit period. Exemplary TIRAs are found in Table 1:

TABLE I

| | |
|---|---|
| Tier I -- Balance greater than $1; less than $5000 | Rate = 2% |
| Tier II -- Balance greater than $5,000; less than $10,000 | Rate = 3% |
| Tier III -- Balance greater than $10,000; less than $25,000 | Rate = 4% |
| Tier IV -- Balance greater than $25,000; less than $50,000 | Rate = 5% |
| Tier V -- Balance greater than $50,000 | Rate = 6% |

Interest rates assigned according to Table I provide incentives for Client account holders to increase their respective balance in order to achieve higher interest rates within the system constraints. Thus, TIRAs track the accounts and apply the appropriate interest rate to the current balance in accordance with the stored protocol.

One refinement of the TIRA method is to assign interest rates on, for example, the total balances held by a Client in all the Client's accounts with the Customer financial entity. Alternatively, interest rates may be tiered according to account balance and the length of time the Client has transacted business with the Customer financial entity, A further refinement of the TIRA operation includes applications to pre-defined Customer financial entity promotions. A spectrum of potential promotional tier stratagems may be stored in the Agent database, and thus are selectively available for use to assist product marketing. Exemplary promotional structures include a single "fixed" tier level (single interest rate) and "variable" tier levels, with interest rates higher for an initial period before returning to base line levels.

The fixed tier structure insures that a Client account earns the same level of interest rate for the promotional period, independent of balance. For example during the promotional period an account may accrue interest at a rate of 5 percent—that is—the rate associated with the tier corresponding to a balance of $25,000 to $100,000 (in Table I), even though the account balance is only $6,000.

Variable tier levels can enhance the interest rates in some or all of the tiers during the promotional period by some factor. For example, during the promotion the enhancement may be 50 basis points ("BP") above the current tier (alternatively, a 15% interest rate bonus), thereby providing a bonus computation of this amount independent of the actual balance, but tied to the balance as done in normal non-promotional operation. Table II below exemplifies a variable promotion TIER arrangement:

TABLE II

| Base Tiers | | | |
|---|---|---|---|
| Tier I -- Greater than $1-less than $5000 | Rate = 1% | | |
| Tier II -- Greater than $5,000-less than $10,000 | Rate = 2% | | |
| Tier III -- Greater than $10,000-less than $25,000 | Rate = 3% | | |
| Tier IV -- Greater than $25,000 | Rate = 4% | | |
| | | Bonus: | |
| Variable Promotion A | | BPs | Period |
| Tier I -- Greater than $1-less than $5000 | Rate = 2% | +.50 | 4/1-6/30 |
| Tier II -- Greater than $5,000-less than $10,000 | Rate = 3% | +.25 | 4/1-6/30 |
| Tier III -- Greater than $10,000-less than $25,000 | Rate = 4% | +.75 | 4/1-6/30 |
| Tier IV -- Greater than $25,000 | Rate = 5% | +.00 | 4/1-6/30 |
| | | Bonus: | |
| Variable Promotion B | | BPs | Period |
| Tier I -- Greater than $1-less than $5000 | Rate = 2% | +.50 | 5/1-7/30 |
| Tier II -- Greater than $5,000-less than $10,000 | Rate = 3% | +.50 | 5/1-7/30 |
| Tier III -- Greater than $10,000-less than $25,000 | Rate = 4% | +.00 | 5/1-7/30 |
| Tier IV -- Greater than $25,000 | Rate = 5% | +.00 | 5/1-7/30 |

Other parameters defining the tiers may be also adjusted by the Customer financial entities to address market conditions. Adjustment (bonus) periods may be lengthened, tiers added or subdivided, and rates may be coupled to current market indexes, such as the one-year Treasury note or Federal Funds rate. Entry of the new tier parameters into the Agent systems and methods implements the new structure.

Figure 4:
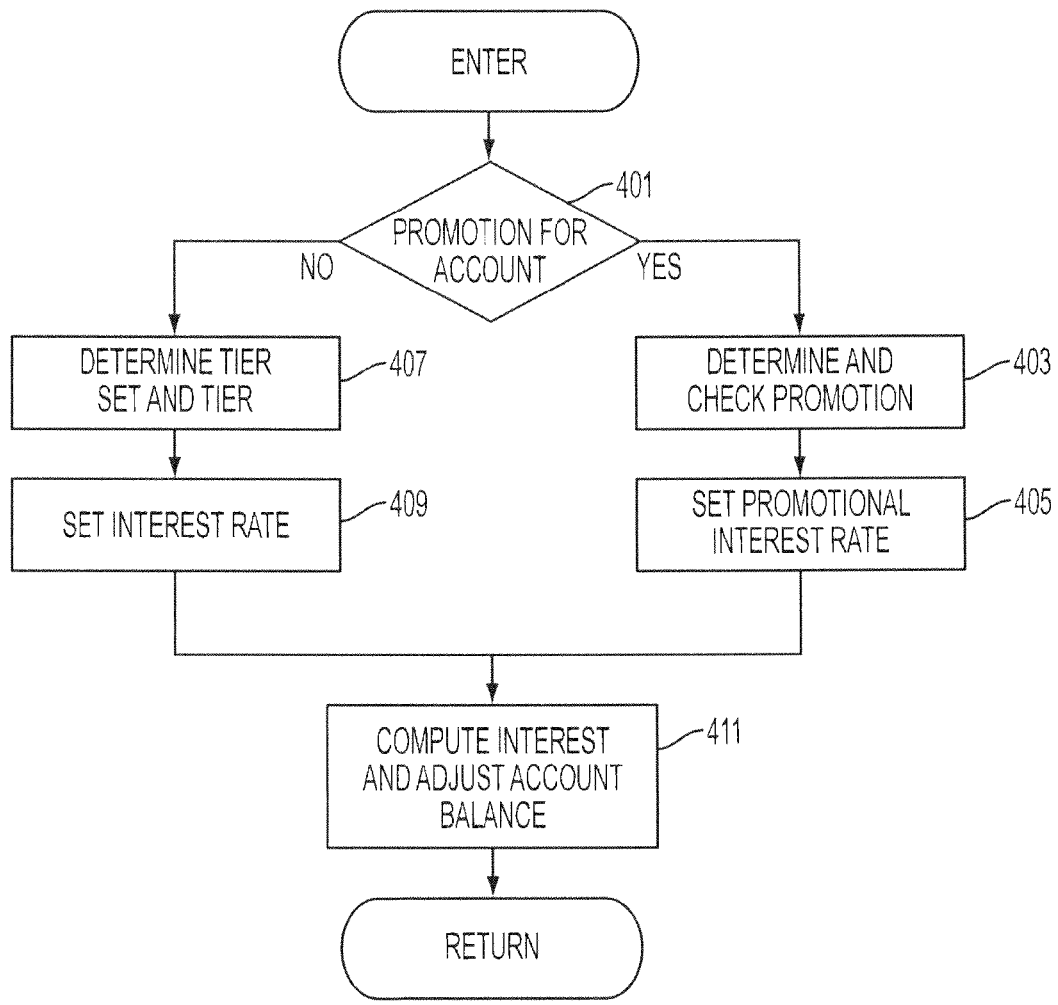
FIG. 4 illustrates an exemplary embodiment of interest-allocation processing of this invention.

FIG. 4 is an exemplary embodiment of Agent processing that is performed for each Client account that implements the preferred tiered interest rate system. As discussed above, the Agent database for each account includes one or more fields with data entries that identify, characterize, and classify each Client from the Customer financial entity's perspective. Preferably, one of these data entries is a promotional field flag indicating whether or not the current account is operating during a pending promotion. This flag is tested at step 401.

A positive response to this test leads to step 403 that determines the particular promotion (from further account record fields) and checks whether this promotion is still active (for example, has not expired). Data for the latter check is retrieved from the Customer financial entity's interest allocation parameters stored in the Agent database. If the promotion is still active, then the promotional interest rate is set 405 for this Client, again using the Customer financial entity's interest rate allocation data. If no promotion is active, the Agent then determines 407 that client tier set (set of tiers that may apply) and particular tier (within the determined tier set) from fields in the Client database record that characterize the type of Client. Next, the interest rate is set 409 using the Customer financial entity's interest rate allocation data.

Interest rate allocation for this Client concludes when the Agent uses the determined interest rate and Client's account balance to calculate 411 the amount of Client interest Exemplary Agent Methods On a regular and, preferably, periodic basis (for example, twice daily, daily, every other day, and so forth), the Agent performs an account-management-processing cycle during which it processes transactions for the Clients of Customer financial entities (and at the Agent itself where it or a commonly controlled entity holds Client accounts) received from various sources. For concreteness and simplicity of description (and without limitation), an Agent processing cycle is described in terms of two phases: a Client/Customer financial entity first phase, and a Supporting financial entity second phase.

Briefly, in the Client/Customer first phase, funds transfers needed between the Agent and the broker/dealers, investment advisors, savings institutions, credit unions, other Customer financial entities, and vendor financial entities that provide transaction services for the clients (referred to above also as "transaction sources") are determined, and the necessary instructions to cause these funds transfers are issued. In this phase, transaction data received for all Client accounts (and new accounts) at all the Customer financial entities (and at the Agent itself where it holds Client accounts directly) is processed in order to obtain for each Client account the net debit or the net credit in that account for that particular period, and its distribution to or from the one or more MMDAs in the Supporting financial entities (with a single MMDA held in each entity). Transaction data is received from the various transaction sources or via sweep files or both.

Also in the first phase, for each Customer the Agent sums the net debits and the net credits received from the Customer for their clients in the daily sweep transaction file to obtain the total net debit or net credit at the Customer financial entity. If the net activity is a credit, the Customer financial entity will transfer funds to the Agent; if the net activity is a debit, the Agent then issues instructions to transfer funds to the Customer financial entity. Exchange of funds with the Agent and then among the Clients of any one Customer is according to that Customer's normal processing. Finally, as the transaction files from the various Transaction sources are processed, the net credits or debits between the Agent and that Transaction source are determined, and instructions to cause this transfer are issued.

In the second phase, the Agent sums the net debits and net credits for all Clients with funds for a Supporting financial entity, and then issues instructions to transfer this amount to or from, respectively, the Supporting financial entity. In the case where the Agent manages two or more MMDAs at two or more Supporting financial entities, the Client net credits and debits are preferably allocated to the Supporting financial entities according to preferences stored in the Client records in the Agent data base. For withdrawals from a Supporting financial entity, the Agent instructs a messenger to have the funds moved from the MMDA to the associated DDA, and then withdraws the funds from the DDA. For deposits, the Agent may direct funds to either the DDA or directly to the MMDA.

This description and the following details are exemplary, and one of skill in the art will recognize that the individual steps illustrated herein may be split, combined, or otherwise rearranged, that the orders of the individual steps and of the phase may be changed, and that other alterations are possible without degrading Agent account management functions. For example, in one alternative, all phases may occur together so that after processing data for each Client account and Customer financial entity, the Supporting financial entity net debit/credit amounts are updated.

Figure 2A:
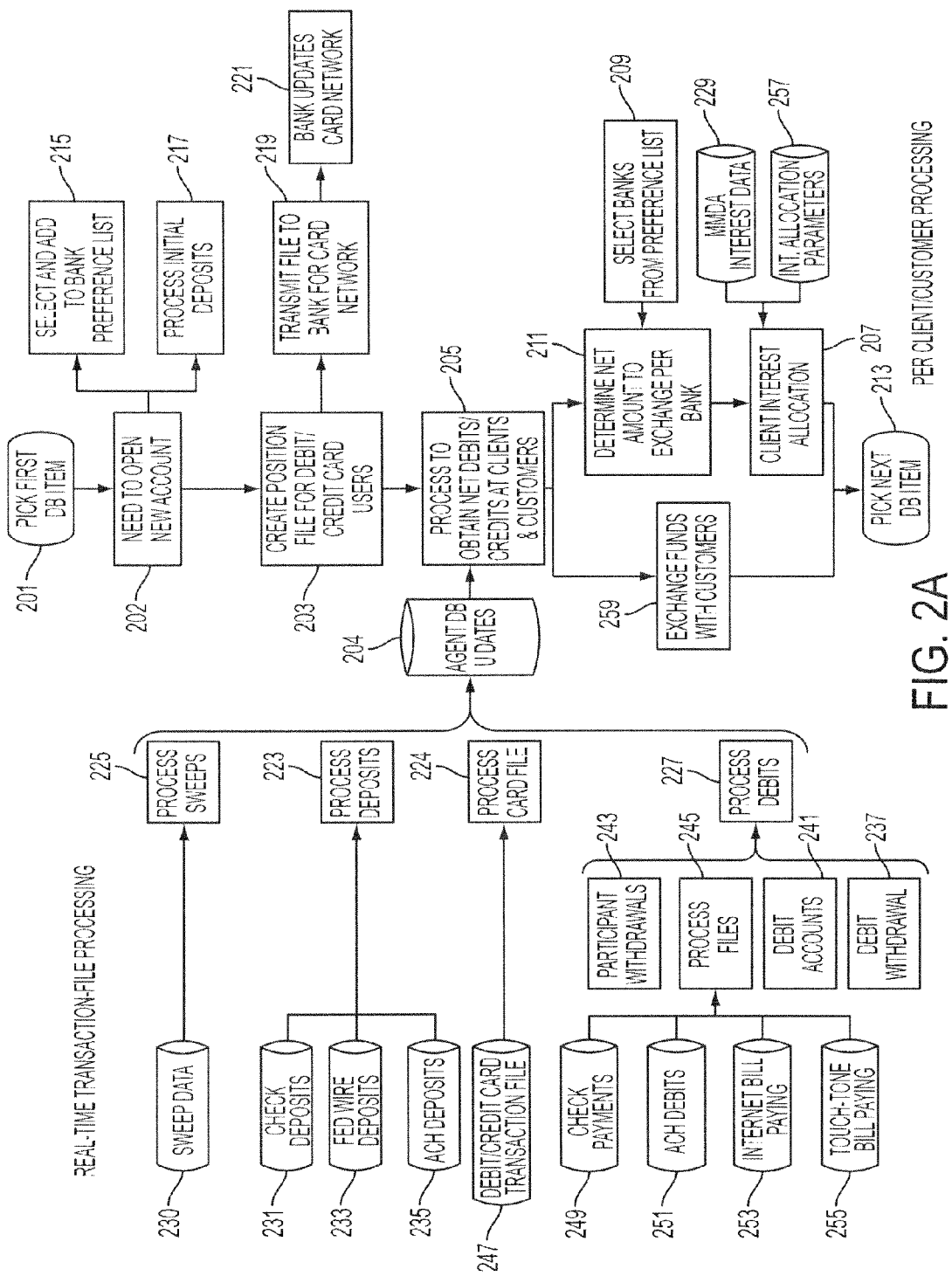
FIGS. 2A-B illustrate an exemplary embodiment of the processing operations of this invention.

These Agent processing phases are now described in more detail with reference to FIGS. 2A-B. FIG. 2A illustrates that the Client/Customer first phase includes two principal processing components or activities that are linked by updates stored in Agent database 204. Generally occurring first in time is the real-time transaction file processing (left portion of FIG. 2A) during which the daily transaction files are processed as they are received and the Agent data base is updated with the transaction results. Generally following the transaction-file processing in time is the per Client/Customer processing during which the Clients and Customer financial entities having transaction activities for the period recorded on data base 204 are individually processed to determine the resulting total net credits or net debits.

Turning to the real-time transaction-file processing, preferably, the Agent systems and methods are structured and configured to receive and process transactions from many normal financial transaction sources and vendors of financial services. Accordingly, FIG. 2A illustrates input of standard sources of credit transactions, namely check deposits 231, Federal Reserve Bank wire deposits 233, and ACH (clearing house) deposits 235. Similarly, the Agent processes debits to Client accounts from a number of sources. Direct debit withdrawals are received and processed at 237. For credit and debit cards, the issuing bank through the card association network provides 247 a transaction file which is processed at 224. Activity in debit accounts is processed at 241, and direct Client withdrawals (for example, a withdrawal made by means of the Agent) are processed at 243. Various sources provide files of debit transactions, including checks presented for payment 249, ACH (clearinghouse) debits 251, bill payments made through Internet bill payment methods 253, and automated telephone bill payment methods such as touchtone bill paying 255. In various embodiments, Agent methods and systems may receive and process transaction for other transaction sources, such as transaction made in person or received by mail and that may be manually keyed (or scanned) into the system.

Transaction files are processed by a hierarchy of one or more processing steps: deposit files are processed at 223; debit/credit card files are processed at 224; various debit transaction files are processed first at 245; and along with other debit transactions are processed at 227. (Note that certain sources may provide debits or credits; for example, card processing usually returns debit transactions but may return an occasional credit if a Client returns an item.) These processing steps generally perform the following similar functions. First, details of individual transaction are preferably stored on the Agent data base on a per Client and per Customer financial entity basis, and as they are being stored (or in subsequent steps), net credits and net debits for each Client and each Customer financial entity are accumulated and stored. Second, net debits or net credits are also accumulated for each of the transaction sources, and after each file is processed, instructions are generated to exchange the net funds with that source.

Concerning sweep file 230 and its processing at 225, data in the sweep files result from a Customer financial entity's processing of Client debit and Client credit transactions received against this account in most recent complete period. For example, a Customer financial entity processes all Client transactions for the previous, ex., twenty-four hour period to generate the sweep file made available in the current twenty-four hour period. For broker/dealers, for example, these transactions would typically result from Client securities purchases or sales. This file is the processed at 225 by the Agent to store the data by Client and Customer financial entity, to accumulate net debits or net credits by Client and Customer financial entity.

The Agent data base 204 is updated by this transaction processing, and the updated database is input to the following per Client/Customer processing.

In FIG. 2A, a "mainline" of per Client/Customer processing extends from 201 directly to 213. Beginning at 201 the Agent starts processing the updated items on the data base for the Clients and the Customers. If the current data item represents a new Client account, then the account is opened and initialized 202 by creating appropriate records in the Agent database. Since these records include the Supporting-financial-entity-preference list of Clients, this list is initialized 215 from either actual Client input or by the Agent in the absence of Client input, and initial deposits are then processed 217. Next, if this Client account has associated credit or debit cards, the card payment network is initialized for the next period's card transactions by creating a position file 203, as is known in the art. This position file is transmitted to the card's issuing bank 219, which then updates the card network 221 so that it may approve or deny transactions in the next processing period (for example, the next day after the current day).

Next all the data base updates with the net credits and net debits for the entity, Client or Customer financial entity, described by the current item being processed are retrieved and combined into a total net 205 for the Client or Customer financial entity. For a Customer financial entity, the Agent may then issue instructions to perform the necessary funds exchanges 259 with that Customer financial entity. Also, concurrently Agent may receive (or already has received) funds swept on that Customer financial entity's initiative.

For each Client account, the next steps of Agent processing are to allocate deposits or withdrawals to the MMDAs in various Supporting financial entities. (If there is only one Supporting financial entity, allocation processing is unnecessary). Each Client account record stores preferences for the various Supporting financial entities, either chosen by the Client or set by default. This list is retrieved 209 and the funds to be exchanged allocated 211 to the preferred Supporting financial entities.

As described, this allocation, preferably, holds funds so that the more preferred Supporting financial entities hold no less funds than the less preferred Supporting financial entities, and each Supporting financial entity holds no more than some threshold (for example, $90,000) that is less than $100,000 for each Client. The result of these last steps are the net funds to be deposited or withdrawn at each Supporting financial entity.

Interest earned by the MMDA accounts 229 is a further source of funds for Client accounts. This Interest accrues daily and is posted monthly in the MMDA at the Supporting financial entities and then in the Clients accounts. Interest allocation is performed as previously described in dependent on interest allocation parameters 257 usually supplied from time-to-time by the Customer financial entities.

Agent processing for a chosen data base item completes at step 213. Then, the Agent picks a next data base item for the next Client or Customer financial entity and begins processing again at 202 until all data base updates made by the transaction processing have been handled.

Figure 2B:
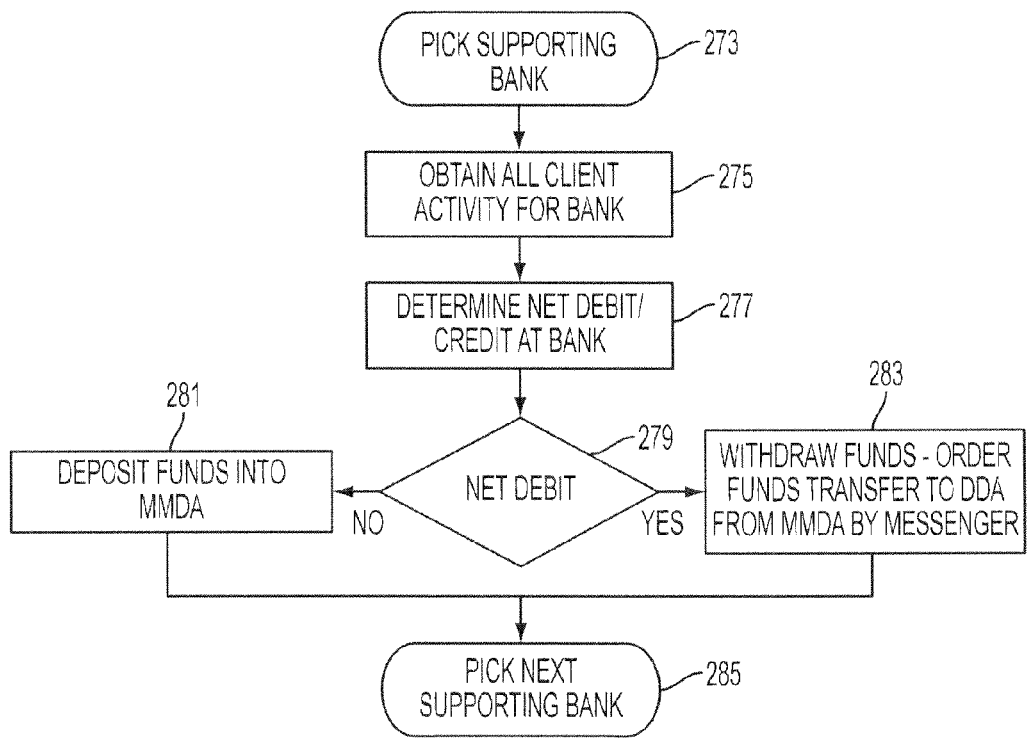

Finally, FIG. 2B illustrates processing for the Supporting financial entity phase of the Agent processing cycle. Further, since each net client debit or credit is withdrawn or deposited to one or more pooled MMDAs in the supporting financial entities, essentially the same summing or netting must be done for each Supporting financial entity as for each Client. The result may be $0, but is usually an amount of funds that must be transferred to or from the MMDAs in the Supporting financial entities to match excess Client (and Transaction source) withdrawals or deposits. Thus, for each Supporting financial entity 273, the net credits or net debits determined for that Supporting financial entity are retrieved 275 and summed 277 to obtain the net total debit or credit at that Supporting financial entity. If the total net is a credit 279, then these funds are deposited to the MMDA(s) at that Supporting financial entity in any convenient manner, optionally by means of the associated DDA(s). If the total is a debit 279, then the Agent generates instructions for a messenger to have the total transferred from the MMDA(s) to the associated DDA(s) and finally transfers the total from the DDA(s) in any manner convenient. The processing is repeated for the next Supporting bank 285. In alternative embodiments, one or more of the steps 273, 275, and 277 may be integrated with Client processing; in other embodiments these steps may be a separate process following Client processing.

The Agent transfers and receives funds for the Customer financial entities, transactions sources and for the Supporting financial entities through an administrative account. All these transfer must, as a group, sum/net to $0, because as an agent, the Agent does not accept deposits or grant credits. In essence, the Agent performs a system-wide crossing/clearing function.

Exemplary Agent Systems

Figure 3:
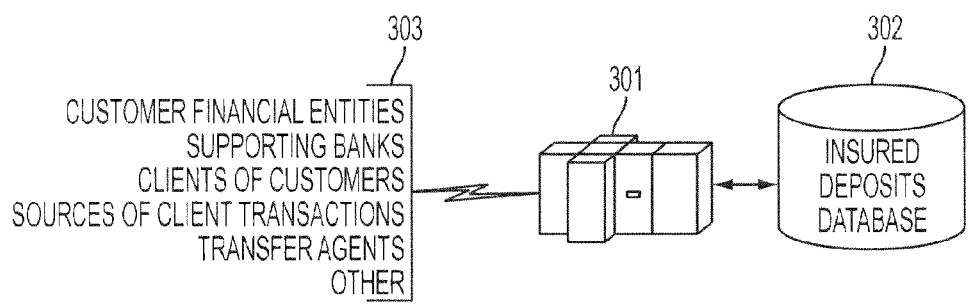
FIG. 3 illustrates an exemplary embodiment of a system of this invention.

The above account management processing, including interest allocation, is performed on Agent computer systems programmed to carry out the above methods. FIG. 3 illustrates exemplary systems are configured from standard commercial-grade components, for example, mainframe-type system 301 coupled to data storage 302 for the Agent databases, here illustrated as the "insured deposits database." A typical processor may be from IBM using an OS/390 or MVS/ESA operating system or the equivalent; a typical database system may be DB2 from IBM or the equivalent, such as products from Oracle Corp.

System 301 is also in communication 303 with Customer financial entities, Supporting financial entities, Clients (where the Agent provides statements and account information directly to Clients), sources of financial transactions (such as those illustrated in FIG. 2A), transfer agents of its Customer financial entities, and Supporting financial entities, and other data sources as necessary. Communication may be by TCP/IP, IBM SNA, or other (bisynchronous) to interface devices attached to system 301. Typically transaction and account information files are transferred over these links.

The methods of this invention may be programmed as one or more modules in convenient commercial programming languages. Either all or a portion of these modules implementing the methods of this invention may be packaged as program products on standard computer readable media (such as magnetic tapes, magnetic or optical discs, and the like).

Additional Specific Embodiments

The above-described elements of this invention relationships may be "packaged" variously to meet the needs of various Customer financial entities. In one embodiment, one Customer financial entity is linked to one Supporting financial entity, so that client accounts may be provided with up to $100,000 of FDIC insurance along with interest and unlimited withdrawals. In a second embodiment, one Customer financial entity is linked to more than one independent, Supporting financial entity so that its clients may receive more than $100,000 of FDIC insurance.

In a third embodiment, a Customer financial entity which is a bank or savings institution may wish to retain all Client funds on its own books so that they may be available for its normal financial activities. This is accommodated by having the Agent managed MMDA-DDA pair (or pairs) be held at the Customer financial entity. Otherwise, the Agent systems and methods are as described above. In this embodiment, Client insurance is limited to $100,000. In such an embodiment, the ownership interests managed by the Agent and recorded on its database may be advantageously realized as separate Client accounts at the Customer financial entity (referred to as a "return sweep account"). Then, a Client will have two accounts, one on the books of the Customer financial entity, for example, a Client demand deposit account, and a second account held on the books of the Agent, a return sweep account The Agent then manages fund exchanges between these accounts so that the funds of all Client return sweep accounts are held in the managed MMDA-DDA pairs.

Such additional embodiments preferably also include flexible allocation of interest earned on the one or more Agent-managed MMDAs according to the characteristics of Client accounts (or according to Customer indications). As described above, the Supporting financial entities credit interest earned to the MMDAs, and the Agent then allocates the credited interest among the Client ownership interests according to Client account characteristics. This allocation is preferably according to interest rates varying according to account balances as determined by a set of tiers, each tier specifying a selected interest rate for a selected range of account balances. However, interest may also be allocated according to other Client of Customer financial entity characteristics, such as the existence of an interest rate promotion.

Systems supporting these embodiments may be separate; one system supporting one embodiment for one client. Or one system may support multiple Customer financial entities using a single embodiment. Advantageously, a single networked system processes multiple Customer financial entities using multiple embodiments. In the latter case, client and Customer financial entity records will contain sufficient information to identify clients related to each Customer financial entity, and further to provide client classification information appropriate to that Customer financial entity (ex., total balance at the Customer financial entity, branch, Customer financial entity history, . . . etc.)

Thus, it can be appreciated that by practicing the embodiment of the invention described in connection with the above figures, an individual Client is effectively provided with FDIC insurance in excess of $100,000 in an account from which unlimited withdrawals are possible. Further, the Customer financial entity holding the Client's base account is enabled to provide interest return flexibly allocated according to various Client characteristics, such as the size of the Client balances.

Further embodiments will be apparent to those of skill in the art and are part of the present invention. In particular, elements of the methods and systems described above may be arranged and combined in further embodiments to achieve the objects of the invention in a manner tailored for particular Customer financial entities, or Clients, or Supporting institutions. Such additional combinations are also part of the present invention.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A method, comprising:
   (A) accessing, using one or more computers, one or more electronic databases, stored on one or more computer-readable media, comprising:
      (i) aggregated account information for a plurality of Federal Deposit Insurance Corporation (FDIC)-insured and interest-bearing aggregated deposit accounts held in a plurality of banks in a program, wherein funds from a first plurality client accounts associated with one or more broker dealers are held in the aggregated deposit accounts in the banks in the program, the aggregated account information for a respective one of the aggregated deposit accounts comprising a balance of funds held in the respective aggregated deposit account; and
      (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account; and
   (B) receiving or obtaining, using the one or more computers, fund transfer data for one or more of the client accounts of a broker-dealer;
   (C) allocating, using the one or more computers, one or more respective amounts to one or more of the banks participating in the program to be held in one or more of the aggregated deposit accounts to take into account at least in part the fund transfer data for the one or more of the client accounts;
   (D) determining, using the one or more computers, an amount of funds to be transferred to or from one or more of the one or more of the banks based at least in part on the allocating step;
   (E) updating in the one or more electronic databases, using the one or more computers, the client account information for each of a second plurality of the client accounts, with update data for each of these client accounts comprising the respective balance of funds from the respective client account held in each of the one or more insured and interest-bearing aggregated deposit accounts holding funds of the respective client account based at least in part on results of the allocating step;
   (F) determining, using the one or more computers, for each of a third plurality of the respective client accounts a respective interest rate from among at least three different interest rates based at least in part on one or more criteria so that funds of some client accounts held in a respective one of the aggregated deposit accounts earns interest at a different interest rate from the funds of other client accounts held in the respective one aggregated deposit account;
   (G) calculating, using the one or more computers, or having calculated using one or more computers, for each of one or more of the client accounts determined to have a first interest rate of the at least three interest rates, a respective interest for funds of the respective client account held in one or more of the aggregated deposit accounts for a period using the first interest rate, with the calculating being independent from the respective client account pro rata share in earnings posted for the one or more aggregated deposit accounts holding funds of the respective client account;
   (H) calculating, using the one or more computers, or having calculated using one or more computers, for each of one or more of the client accounts determined to have a second interest rate of the at least three interest rates, a respective interest for funds of the respective client account held in one or more of the aggregated deposit accounts for the period using the second interest rate, with the calculating being independent from the respective client account pro rata share in earnings posted for the one or more aggregated deposit accounts holding funds of the respective client account;
   (I) determining for each of a fifth plurality of the respective client accounts, using the one or more computers, interest earned for the respective client account on funds held during the period in each of the one or more aggregated deposit accounts in the program holding funds of the respective client account; and
   (J) updating or having updated the one or more electronic databases, using the one or more computers, to include the respective interest earned for the respective client accounts based at least in part on the funds of the respective client account held in the one or more aggregated deposit accounts.

2. The method as defined in claim 1, wherein the fund transfer data received, using the one or more computers, comprises client funds that exceed a target balance in a customer financial entity account of the respective client.

3. The method as defined in claim 1, wherein the allocating step comprises allocating funds of a respective one of the client accounts to a first one of the banks in the program for one or more of the one or more aggregated deposit accounts held therein, up to a predetermined amount, and then allocating remaining funds of the client account up to the predetermined amount to a second one of the banks in the program for one or more of the one or more aggregated deposit accounts held therein.

4. The method as defined in claim 1,
   wherein one of the plurality of the banks is designated as a primary bank for one of the client accounts, and
   wherein the allocating step comprises allocating funds of the respective one client account up to a predetermined amount to each of the banks in the program for one or more of the one or more aggregated deposit accounts held therein, and then allocating remaining funds of the respective one client account to the primary bank for the respective one client account.

5. The method as defined in claim 1,
wherein the fund transfer data received or obtained using the one or more computers comprises transaction data from an external ACH system, and
wherein the one or more computers are linked via one or more electronic networks to one or more computers of the external ACH system.

6. The method as defined in claim 1,
wherein the fund transfer data received or obtained using the one or more computers comprises transaction data from an external credit card processing system, and
wherein the one or more computers are linked via one or more electronic networks to one or more computers of the external credit card processing system.

7. The method as defined in claim 1,
wherein the fund transfer data received or obtained using the one or more computers comprises transaction data from an external debit card processing system, and
wherein the one or more computers are linked via one or more electronic networks to one or more computers of the external debit card processing system.

8. The method as defined in claim 1,
wherein the fund transfer data received or obtained using the one or more computers comprises transaction data from a check/draft payments system, and
wherein the one or more computers are linked via one or more electronic networks to one or more computers of the check/draft payment system.

9. The method as defined in claim 1,
wherein the fund transfer data received or obtained using the one or more computers comprises transaction data from an external FED wire transfers system, and
wherein the one or more computers are linked via one or more electronic networks to one or more computers of the external FED wire transfers system.

10. The method as defined in claim 1,
wherein the fund transfer data received or obtained using the one or more computers comprises transaction data via input received from a telephone, and
wherein the one or more computers are linked via one or more electronic networks to the telephone.

11. The method as defined in claim 1,
wherein the fund transfer data received or obtained using the one or more computers comprises transaction data via the Internet,
and
wherein the one or more computers are linked via one or more electronic networks to the Internet.

12. The method as defined in claim 1, wherein one of the one or more criteria for determining the interest rate comprises a sum of balances of a plurality of the client accounts associated with client.

13. The method as defined in claim 1, wherein one of the one or more criteria for determining the interest rate for a respective one of the client accounts comprises a balance of client funds of the client account managed in the program.

14. The method as defined in claim 1,
wherein each of a fourth plurality of the client accounts are associated with a respective customer financial entity and have respective customer financial accounts therewith, and
wherein one of the one or more criteria for determining the interest rate for a respective one of the fourth plurality of the client accounts comprises a balance of funds of the respective customer account at the customer financial entity.

15. The method as defined in claim 1, wherein one of the one or more criteria for determining the interest rate for a respective one of the client accounts comprises a date on which the respective one client account was opened.

16. The method as defined in claim 1, wherein one of the one or more criteria for determining the interest rate for a respective one of the client accounts comprises a duration associated with the respective one client account.

17. The method as defined in claim 1, wherein one of the one or more criteria for determining the interest rate for a respective one of the client accounts comprises a duration associated with the respective interest rate.

18. The method as defined in claim 1, wherein one of the one or more criteria for determining the interest rate for a respective one of the client accounts comprises whether a promotional rate applies.

19. The method as defined in claim 1, wherein one of the one or more criteria for determining the interest rate for a respective one of the client accounts comprises a respective client financial entity associated with the respective one client account.

20. The method as defined in claim 1, wherein one of the one or more criteria for determining the interest rate for a respective one of the client accounts comprises a respective residence of the client associated with the respective one client account.

21. The method as defined in claim 1, wherein one of the one or more criteria for determining the interest rate for a respective one of the client accounts comprises a customer type of the client associated with the respective one client account.

22. The method as defined in claim 1,
wherein each of a fourth plurality of the client accounts are associated with a respective customer financial entity, and
wherein one of the one or more criteria for determining the interest rate for a respective one of the client accounts of the fourth plurality of the client accounts comprises an amount borrowed by the respective client associated with the respective one client account from the respective customer financial entity.

23. The method as defined in claim 1,
wherein each of a fourth plurality of the client accounts are associated with a respective customer financial entity, and
wherein one of the one or more criteria for determining the interest rate for a respective one of the fourth plurality of the client accounts comprises a length of time that the respective client associated with the respective one client account has transacted business with the respective customer financial entity.

24. The method as defined in claim 1, wherein one or more of the aggregated deposit accounts comprise an FDIC-insured interest-bearing aggregated money market deposit account.

25. The method as defined in claim 1, wherein one or more of the aggregated deposit accounts comprise at least one FDIC-insured interest-bearing aggregated NOW account.

26. The method as defined in claim 1, wherein at least one of the aggregated deposit accounts held in at least one of the banks comprises an FDIC-insured interest-bearing aggregated money market deposit account, and the at least one bank further holds an FDIC-insured aggregated demand deposit account associated with the program; and wherein the method further comprises generating or have generated instructions to withdraw funds from the FDIC-insured aggregated money market deposit account via the FDIC-insured aggregated demand deposit account.

27. The method as defined in claim 1,
wherein each of a fourth plurality of the client accounts are associated with a respective customer financial entity, and
wherein the allocating step, using the one or more computers, comprises allocating funds to or from one or more of the fourth plurality of client accounts to one or more of the banks participating in the program that are affiliated with the customer financial entity.

28. A system, comprising:
one or more computers connected to access computer-readable memory that is configured with programming code that is capable, when executed, to cause the following steps to be performed:
  (A) accessing, using the one or more computers, one or more electronic databases, stored on one or more computer-readable media, comprising:
    (i) aggregated account information for a plurality of Federal Deposit Insurance Corporation (FDIC)-insured and interest-bearing aggregated deposit accounts held in a plurality of banks in a program, wherein funds from a first plurality client accounts associated with one or more broker dealers are held in the aggregated deposit accounts in the banks in the program, the aggregated account information for a respective one of the aggregated deposit accounts comprising a balance of funds held in the respective aggregated deposit account; and
    (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account; and
  (B) receiving or obtaining, using the one or more computers, fund transfer data for one or more of the client accounts of a broker-dealer;
  (C) allocating, using the one or more computers, one or more respective amounts to one or more of the banks participating in the program to be held in one or more of the aggregated deposit accounts to take into account the fund transfer data for the one or more of the client accounts;
  (D) determining, using the one or more computers, an amount of funds to be transferred to or from one or more of the one or more of the banks based at least in part on the allocating step;
  (E) updating in the one or more electronic databases, using the one or more computers, the client account information for each of a second plurality of the client accounts, with update data for each of these client accounts comprising the respective balance of funds from the respective client account held in each of the one or more insured and interest-bearing aggregated deposit accounts holding funds of the respective client account based at least in part on results of the allocating step;
  (F) determining, using the one or more computers, for each of a third plurality of the respective client accounts a respective interest rate from among at least three different interest rates based at least in part on one or more criteria so that funds of some client accounts held in a respective one of the aggregated deposit accounts earns interest at a different interest rate from the funds of other client accounts held in the respective one aggregated deposit account;
  (G) calculating, using the one or more computers, or having calculated using one or more computers, for each of one or more of the client accounts determined to have a first interest rate of the at least three interest rates, a respective interest for funds of the respective client account held in one or more of the aggregated deposit accounts for a period using the first interest rate, with the calculating being independent from the respective client account pro rata share in earnings posted for the one or more aggregated deposit accounts holding funds of the respective client account;
  (H) calculating, using the one or more computers, or having calculated using one or more computers, for each of one or more of the client accounts determined to have a second interest rate of the at least three interest rates, a respective interest for funds of the respective client account held in one or more of the aggregated deposit accounts for the period using the second interest rate, with the calculating being independent from the respective client account pro rata share in earnings posted for the one or more aggregated deposit accounts holding funds of the respective client account;
  (I) determining for each of a fifth plurality of the respective client accounts, using the one or more computers, interest earned for the respective client account on funds held during the period in each of the one or more aggregated deposit accounts in the program holding funds of the respective client account; and
  (J) updating or having updated the one or more electronic databases, using the one or more computers, to include the respective interest earned for the respective client accounts based at least in part on the funds of the respective client account held in the one or more aggregated deposit accounts.

* * * * *